United States Patent
Hsu et al.

(10) Patent No.: US 7,958,055 B2
(45) Date of Patent: Jun. 7, 2011

(54) METHOD AND APPARATUS FOR TEMPORARY OWNERSHIP OF DIGITAL ITEMS IN A NETWORK DATA PROCESSING SYSTEM

(75) Inventors: Jimmy Ming-Der Hsu, Austin, TX (US); Peter Y. Hsu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1997 days.

(21) Appl. No.: 10/651,717

(22) Filed: Aug. 29, 2003

(65) Prior Publication Data

US 2005/0049972 A1 Mar. 3, 2005

(51) Int. Cl.
*G06F 21/00* (2006.01)

(52) U.S. Cl. ........... 705/53; 705/51; 705/52; 705/54; 705/55; 705/56; 705/57; 705/58; 705/50; 705/59; 705/75; 705/80; 713/185; 713/158; 713/176; 726/5

(58) Field of Classification Search .......... 795/51–59; 380/4; 235/380; 705/51–59
See application file for complete search history.

(56) References Cited

U.S. PATENT DOCUMENTS

| | | | |
|---|---|---|---|
| 5,629,980 A * | 5/1997 | Stefik et al. ............ 705/54 |
| 5,796,979 A | 8/1998 | Arimilli et al. |
| 5,809,144 A | 9/1998 | Sirbu et al. |
| 5,892,900 A | 4/1999 | Ginter et al. ............ 395/186 |
| 5,903,878 A | 5/1999 | Talati et al. |
| 5,909,492 A | 6/1999 | Payne et al. |
| 5,949,876 A | 9/1999 | Ginter et al. |
| 6,119,229 A | 9/2000 | Martinez et al. |
| 6,135,646 A | 10/2000 | Kahn et al. |
| 6,185,683 B1 | 2/2001 | Ginter et al. |
| 6,233,565 B1 | 5/2001 | Lewis et al. |
| 6,343,738 B1 * | 2/2002 | Ogilvie ............ 705/26 |
| 6,353,929 B1 | 3/2002 | Houston ............ 725/20 |
| 6,547,134 B2 | 4/2003 | Ogilvie |
| 6,591,250 B1 | 7/2003 | Johnson et al. |
| 6,944,948 B2 | 9/2005 | Pompier |
| 6,959,290 B2 | 10/2005 | Stefik et al. |
| 7,243,230 B2 | 7/2007 | England et al. |
| 2001/0056383 A1 | 12/2001 | Shuster |

(Continued)

OTHER PUBLICATIONS http://www.ironmountain.com//services/service.asp?svc1_content=6, "DSI Technology Escrow", Mar. 20, 2003, p. 1.

(Continued)

*Primary Examiner* — Calvin Loyd Hewitt, II
*Assistant Examiner* — Cristina Owen Sherr
(74) *Attorney, Agent, or Firm* — Yee & Associates, P.C.; Justin M. Dillon

(57) ABSTRACT

A method, apparatus, and computer instructions for leasing a unique digital item in a network data processing system. A listing request is received for a payment and a deposit in the account of a first party. A listing request is received for a unique digital item in the account of a second party. Responsive to receiving the listing requests, the respective digital properties are transferred to a temporary storage account in association with retrieval tags. Listings for the digital properties appear on a trusted third-party leasing service. A lease contract is drawn up between the parties. After all parties have signed the lease agreement, the payment is transferred to the second party and the unique digital item is transferred to the first party. The deposit is held by the trusted third-party leasing service until the unique digital item is returned.

18 Claims, 16 Drawing Sheets

U.S. PATENT DOCUMENTS

| | | | |
|---|---|---|---|
| 2002/0059425 A1 | 5/2002 | Belfiore et al. | 709/226 |
| 2002/0137565 A1 | 9/2002 | Blanco | 463/46 |
| 2004/0138962 A1* | 7/2004 | Kopelman et al. | 705/26 |
| 2004/0148221 A1* | 7/2004 | Chu | 705/14 |
| 2004/0204994 A1* | 10/2004 | Olson | 705/14 |
| 2005/0177437 A1 | 8/2005 | Ferrier | |

OTHER PUBLICATIONS http://www.dlib.org/dlib/april96/04schutzer.html, "A Need for a Common Infrastructure", Mar. 20, 2003, pp. 1-8.

* cited by examiner

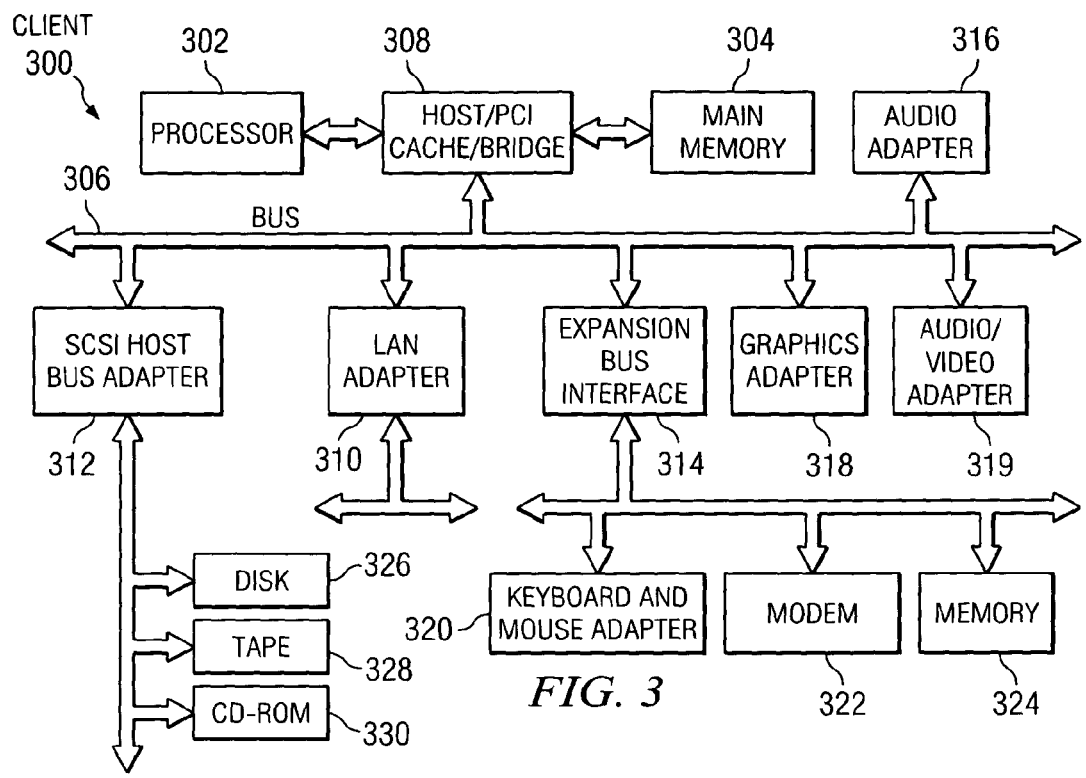
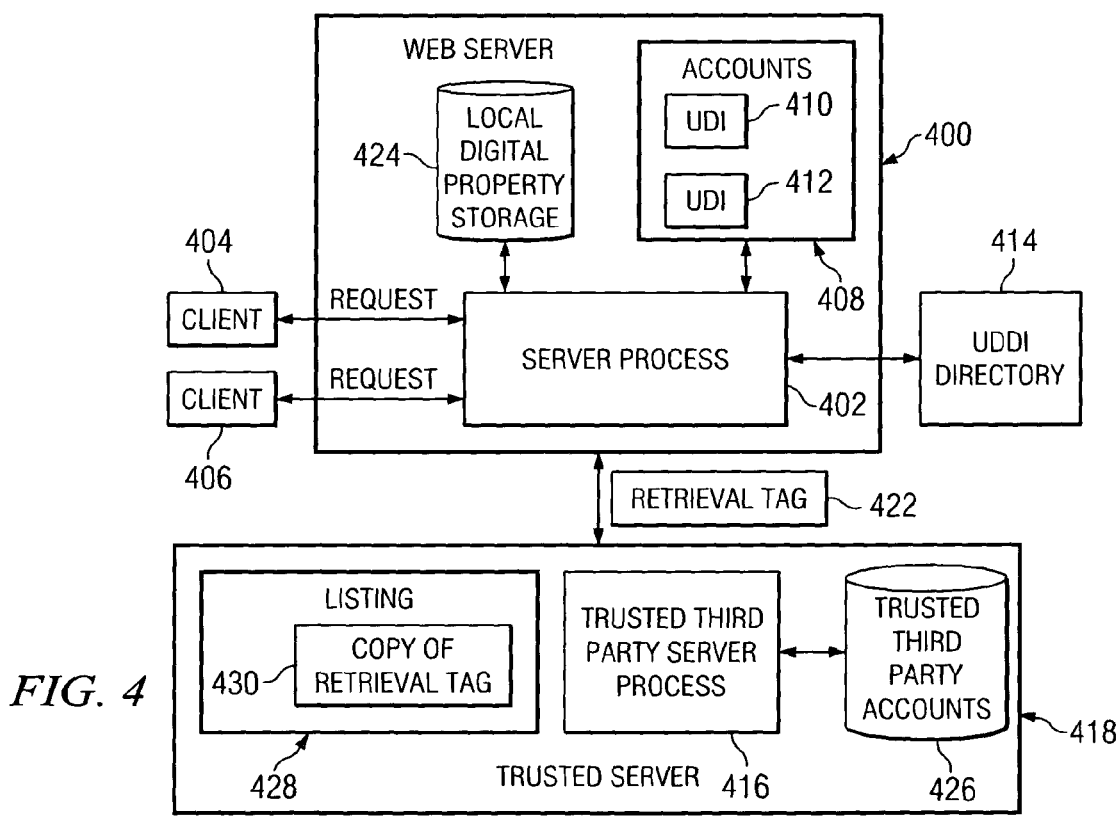

METHOD AND APPARATUS FOR TEMPORARY OWNERSHIP OF DIGITAL ITEMS IN A NETWORK DATA PROCESSING SYSTEM

CROSS REFERENCE TO RELATED APPLICATION

The present invention is related to the following application entitled: "Method and Apparatus for Trading Digital Items in a Network Data Processing System," Ser. No. 10/651,715, assigned to the same assignee, and incorporated herein by reference.

BACKGROUND OF THE INVENTION

1. Technical Field

The present invention relates generally to an improved data processing system and in particular, to an improved method, apparatus, and computer instructions for transferring data. Still more particularly, the present invention provides an improved method, apparatus, and computer instructions for exchanging digital items.

2. Description of Related Art

The Internet, also referred to as an "internetwork", is a set of computer networks, possibly dissimilar, joined together by means of gateways that handle data transfer and the conversion of messages from a protocol of the sending network to a protocol used by the receiving network. When capitalized, the term "Internet" refers to the collection of networks and gateways that use the TCP/IP suite of protocols.

The Internet has become a cultural fixture as a source of both information and entertainment. Many businesses are creating Internet sites as an integral part of their marketing efforts, informing consumers of the products or services offered by the business or providing other information seeking to engender brand loyalty. Many federal, state, and local government agencies are also employing Internet sites for informational purposes, particularly agencies which must interact with virtually all segments of society such as the Internal Revenue Service and secretaries of state. Providing informational guides and/or searchable databases of online public records may reduce operating costs. Further, the Internet is becoming increasingly popular as a medium for commercial transactions.

Currently, the most commonly employed method of transferring data over the Internet is to employ the World Wide Web environment, also called simply "the Web". Other Internet resources exist for transferring information, such as File Transfer Protocol (FTP) and Gopher, but have not achieved the popularity of the Web. In the Web environment, servers and clients effect data transaction using the Hypertext Transfer Protocol (HTTP), a known protocol for handling the transfer of various data files (e.g., text, still graphic images, audio, motion video, etc.). The information in various data files is formatted for presentation to a user by a standard page description language, the Hypertext Markup Language (HTML). In addition to basic presentation formatting, HTML allows developers to specify "links" to other Web resources identified by a Uniform Resource Locator (URL). A URL is a special syntax identifier defining a communications path to specific information. Each logical block of information accessible to a client, called a "page" or a "Web page", is identified by a URL. The URL provides a universal, consistent method for finding and accessing this information, not necessarily for the user, but mostly for the user's Web "browser". A browser is a program capable of submitting a request for information identified by an identifier, such as, for example, a URL. A user may enter a domain name through a graphical user interface (GUI) for the browser to access a source of content. The domain name is automatically converted to the Internet Protocol (IP) address by a domain name system (DNS), which is a service that translates the symbolic name entered by the user into an IP address by looking up the domain name in a database.

While the Internet is commonly used to sell the types of goods typically offered in a so-called "brick and mortar" business, the Internet also is used to transfer digital goods, which may exist nowhere else. The Internet also is widely used to transfer applications to users using browsers. With respect to commerce on the Web, individual consumers and businesses use the Web to purchase various goods and services. In offering goods and services, some companies offer goods and services solely on the Web while others use the Web to extend their reach. Many items exist only on servers on the Web. In the digital world, money may be manifested as "e-money" or "digital cash". With e-money, a digitally signed and encrypted block of data representing a money order on a bank is used. Another example of digital property is music, which may be purchased and possessed. The popularity of online gaming communities is a growing trend. In many of these gaming environments, digital items or properties may be traded between different players. For example, armors, rings, weapons, characters, and even castles may be traded between different players. Some of these items have even been auctioned on auctioning websites. All of these are examples of the rapid acceptance of digital property.

With many of these applications, interfaces are present for trading property within the same application. The present invention recognizes that a secure system for trading property between different applications and different users is absent. With the insecure mechanisms presently used, a multitude of scams and fraudulent transfers have occurred.

Therefore, it would be advantageous to have an improved method, apparatus, and computer instructions for exchanging digital items.

SUMMARY OF THE INVENTION

The present invention provides a method, apparatus, and computer instructions for leasing a unique digital item in a network data processing system. A first party desires temporary ownership of a unique digital item held by a second party. A listing request is received for a payment and a deposit in the account of a first party. A listing request is received for a unique digital item in the account of a second party. Responsive to receiving the listing requests, the respective digital properties are transferred to a temporary storage account in association with retrieval tags. Listings for the digital properties appear on a trusted third-party leasing service. A lease contract is drawn up between the parties. After all parties have signed the lease agreement, the payment is transferred to the second party and the unique digital item is transferred to the first party. The deposit is held by the trusted third-party leasing service until the unique digital item is returned.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram illustrating a data processing system in which the present invention may be implemented;

FIG. 4 is a block diagram illustrating components used in transferring unique digital items in accordance with a preferred embodiment of the present invention;

DETAILED DESCRIPTION OF THE PREFERRED EMBODIMENT

Figure 1:
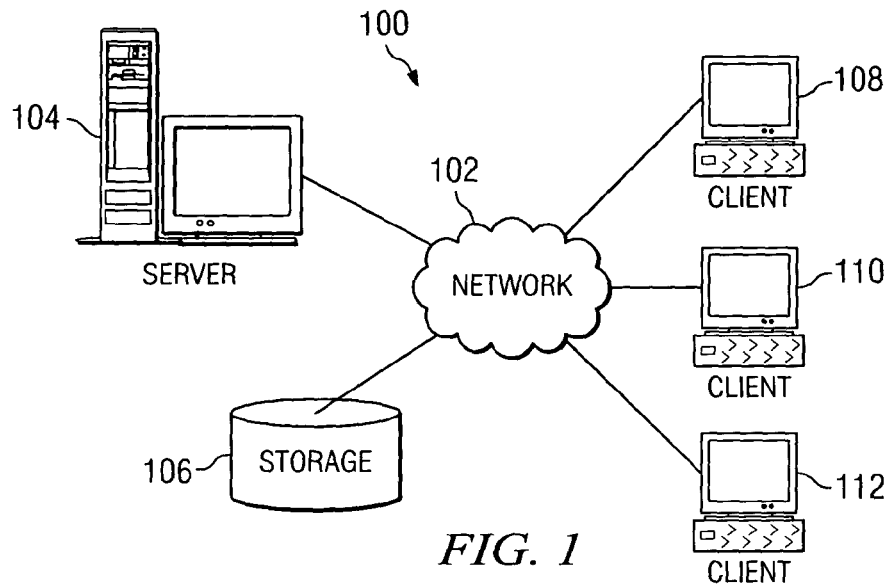
FIG. 1 is a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. Clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
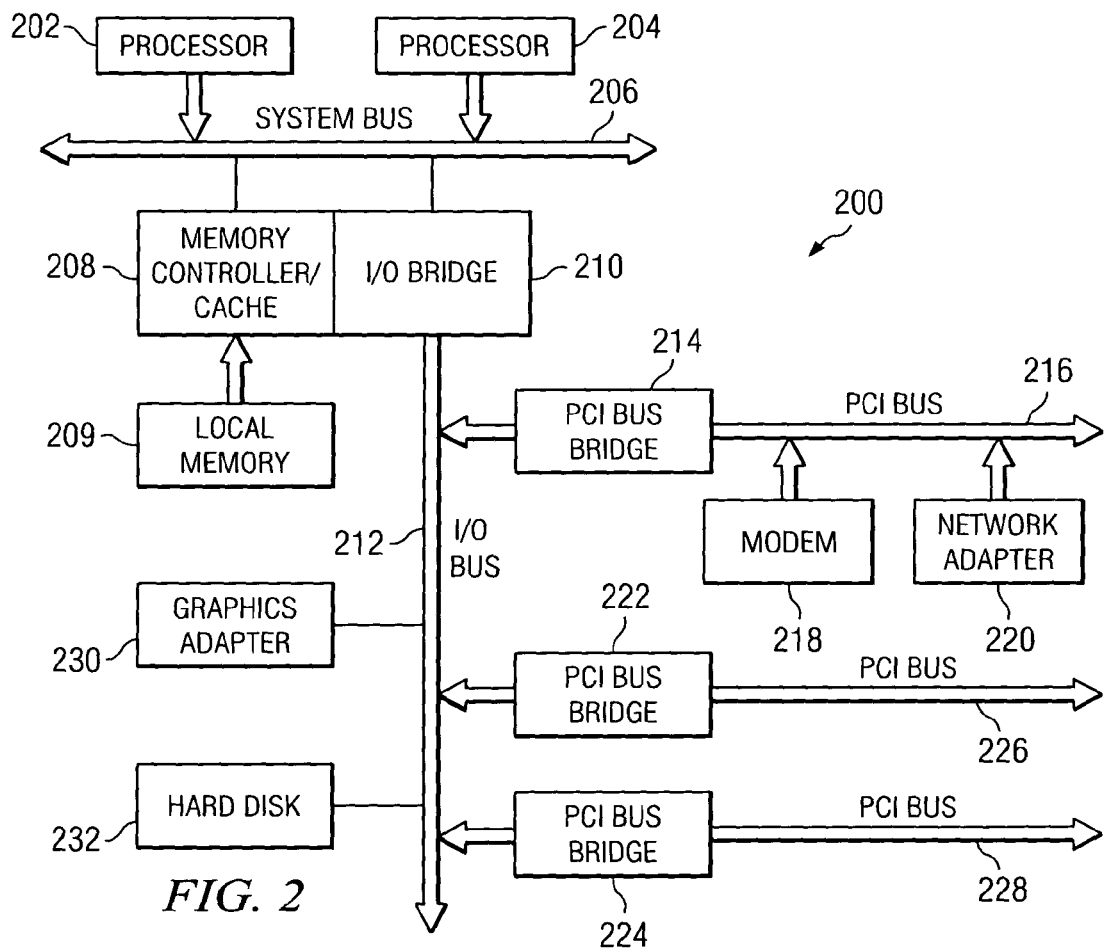
FIG. 2 is a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in boards.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

With reference now to FIG. 3, a block diagram illustrating a data processing system is depicted in which the present invention may be implemented. Data processing system 300 is an example of a client computer. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, Small computer system interface (SCSI) host bus adapter 312, and expansion bus interface 314 are connected to PCI local bus 306 by direct component connection. In contrast, audio adapter 316, graphics adapter 318, and audio/video adapter 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows XP, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash read-only memory (ROM), equivalent nonvolatile memory, or optical disk drives and the like, may be used in addition to or in place of the hardware depicted in FIG. 3. Also, the processes of the present invention may be applied to a multiprocessor data processing system.

As another example, data processing system 300 may be a stand-alone system configured to be bootable without relying on some type of network communication interfaces As a further example, data processing system 300 may be a personal digital assistant (PDA) device, which is configured with ROM and/or flash ROM in order to provide non-volatile memory for storing operating system files and/or user-generated data.

The depicted example in FIG. 3 and above-described examples are not meant to imply architectural limitations. For example, data processing system 300 also may be a notebook computer or hand held computer in addition to taking the form of a PDA. Data processing system 300 also may be a kiosk or a Web appliance.

The present invention provides an improved method, apparatus, and computer instructions for trading digital property. Digital property is an item that exists in electronic form. Many items that exist in the world have analogs in the cyber world. The mechanism of the present invention is directed towards unique digital items that exist on a network data processing system, such as the Internet. The present invention provides a mechanism to exchange a unique digital item in which this item is placed into escrow prior to a transaction. These unique digital items may take many forms, for example, in a gaming environment an electronic trading card, token, currency, character, ring, castle, or armor. Fraud is prevented by using a trusted third-party, as well as allowing inspection of the digital item. In other words, the present invention provides a mechanism for monitored transfer of unique digital property between different realms in which these realms may be incompatible or do not have a mutual trust mechanism. A realm may be, for example, an environment in which the unique digital property is used or originates. Two realms may exist on the same server or on different server computers. The mechanism of the present invention also provides a way to rent or lease unique digital items.

Turning next to FIG. 4, a block diagram illustrating components used in transferring unique digital items is depicted in accordance with a preferred embodiment of the present invention. In this example, Web server 400 includes server process 402, which is used to process requests from clients. Web server 400 may be implemented using a data processing system, such as data processing system 200 in FIG. 2. Web server 400 is a storage server. A storage server is a server on which a unique digital item is located. This storage server may be, for example, a game server or any server on which a unique digital item can be held.

In these examples, clients may be, for example, client 424 and client 426. These clients may be implemented, using a data processing system, such as data processing system 300 in FIG. 3. In this example, digital property is owned by different users. Users at these clients may agree to exchange digital property using a trusted third-party service. In these examples, the property is a unique digital item. The unique digital item is associated with a user in accounts 408. An account in which a unique digital item is held is hereinafter referred to as a storage account. In these examples, the digital property includes first unique digital item 410 and second unique digital item 412.

User at client 404 sends a request to list a unique digital item, such as unique digital item 410. This request is hereinafter referred to as a listing request, which is received by server process 402. In response to receiving this request, server process 402 queries universal description discovery and integration (UDDI) directory 414 to obtain a list of digital trusted third-party service providers, such as an escrow service. This list of providers is returned to client 404. The user at client 404 may then select one of the services. When the trusted third-party service is selected, the user may assign the unique digital item to another party, which is the recipient. This allows the user to select a trusted conduit through which to transfer unique digital item 410.

Universal description, discovery and integration is an industry initiative for a universal business registry (catalog) of Web services. UDDI is designed to enable software to automatically discover and integrate with services on the Web. UDDI contains white pages (addresses and contacts), yellow pages (industry classification) and green pages (description of services). The green pages include the XML version, type of encryption and a document type definition (DTD) of the standard. UDDI messages ride on top of the simple object access protocol (SOAP), which invokes services on the Web.

In response to a selection of a service by the user, server process 402 queries UDDI directory 414 to obtain a Web services definition language (WSDL) Web service interface description for the selected digital trusted third-party service. WSDL is a protocol for a Web service to describe its capabilities. WSDL describes the protocols and formats used by the service. WSDL descriptions can be housed in a UDDI directory, and the combination is used to promote the use of Web services worldwide.

Preferably using a Web service interface description, such as WSDL, Web server 400 sends a listing request to the Web service interface for the trusted third-party service. The listing request is used to list a unique digital item on a trusted third-party server. In this example, the interface is to trusted third-party server process 416 in trusted third-party server 418. Trusted third-party server 418 may be implemented using a data processing system, such as data processing system 200 in FIG. 2. Trusted third-party server 418 may include trusted third-party accounts, which are accounts on which a listing of a unique digital item may be made.

In sending a listing request, server process 402 generates retrieval tag 422, which forms the listing request in these examples. Retrieval tag 422 is digitally signed by server process 402. The retrieval tag contains the name of server process 402, a URL address of the Web service for server process 402, a retrieval tag ID, the originating account ID, a digital item ID, a digital item descriptor, a digital item property type, and metadata. A digital item ID is a unique item ID used by server process 402 to track the item. A digital item descriptor provides a mechanism for users to inspect the digital item and may contain a descriptor string and a file to graphically view the digital item. The digital property type provides a mechanism to verify on which servers the digital item can reside. Metadata may contain, for example, an expiration timestamp, a temporary storage account ID, or any other descriptive information.

This retrieval tag is then sent to trusted third-party server process 416 as part of a listing request from Web server 400 to trusted third-party server 418. This service may be implemented using a data processing system, such as data processing system 200 in FIG. 2. Retrieval tag 422 includes the originating storage account ID, which is used by trusted third-party server process 416 to determine which of its trusted third-party accounts is to receive the listing of the unique digital item.

After receiving the listing request, trusted third-party server process 416 authenticates the data in this request. This data is authenticated by comparing the digital signature sent with the data against a published public key for Web server 400. After the data has been authenticated, trusted third-party server process 416 generates a listing in a trusted third-party account for a user, such as a user at client 404. This listing includes retrieval tag 422.

After sending the listing request, server process 402 transfers unique digital item 410 to digital property temporary storage 424. Trusted third-party server process 418 receives the listing request and creates listing 428 and makes a copy of retrieval tag 422. This copy is referred to as copy of retrieval tag 430.

After unique digital item 410 has been listed, a time stamp is associated with the unique digital item. This time stamp can be used to define a period of time after which the unique digital item will be de-listed and returned to the originating account if a transfer has not been made. The retrieval tag of a listed item is to be held exclusively by the trusted third-party at all times to prevent outside parties from misusing the retrieval tag.

Parties may exchange listings for unique digital items on the trusted third-party server. When a listing changes ownership, trusted third-party server process 418 sends a temporary ownership transfer request to server process 402 in which the request contains copy of retrieval tag 430 and a storage account ID. In this case, a new retrieval tag is generated by server process 402, containing the new storage account ID, and returned to trusted third-party server process 418. Copy of retrieval tag 430 is transmitted from server process 402 to server process 418. Server process 418 decodes the message and stores copy of retrieval tag 430 in memory. A link or pointer to copy of retrieval tag 430 is added to the trusted third-party account's list of retrieval tags. When this happens, the account is said to "hold" the retrieval tag.

To redeem unique digital item 410 out of escrow back onto a server on which the item may be used, a redemption request is sent to server process 402. For example, trusted third-party server process 416 may send a redemption request to server process 402 in which this request includes retrieval tag 422. Such a redemption request may be done by trusted third-party server process 416 on behalf of a client such as 404 or 406. The redemption request also includes a recipient account ID which indicates a destination storage account for digital item 410. The redemption request may be made by parties or representatives of parties, such as the buyer. Any account with the trusted third-party can make a redemption request provided that account "holds" the retrieval tag for the unique digital item to be redeemed. Upon receiving a redemption request, server process 402 authenticates the redemption request and identifies the digital property associated with retrieval tag 422. In this instance, unique digital item 410 is associated with retrieval tag 422. This item is found within local digital property storage 424 in these examples. Unique digital item 410 is then placed into the account identified in the redemption request.

Further, in some cases, the user placing the unique digital item in escrow, such as a user at client 404 wishes to withdraw the unique digital item from escrow. In this case, client 404 would request the unique digital item from trusted third-party server 416. Trusted third-party server process 416 sends a redemption request to server process 402 using retrieval tag 422.

The different transactions described in FIG. 4 are secure transactions, such as secure sockets layer (SSL) When an SSL session is started, the server sends its public key to the browser, which the browser uses to send a randomly generated secret key back to the server in order to have a secret key exchange for that session.

Further, these components may be used in a lease or rental system in which temporary ownership of digital property occurs. Temporary ownership as used herein is for a temporary transfer or exchange of a unique digital item. With temporary ownership, a unique digital item may be reassigned or designated to another user on a server on which the unique digital item resides. With temporary ownership, the unique digital item also may be moved to another server in addition to having a different user assigned as the owner or possessor of the item. After a period of time or after some triggering event, the unique digital item is then returned to the original user. The triggering event may be an occurrence of an event, such as, for example, an occurrence of a storm or appearance of an item in an online game.

For example, a party at client 404 may have a unique digital item, such as unique digital item 410 that a party at client 406 desires to lease or rent. This party at client 406 provides a payment and a deposit in these examples.

The parties mutually agree to use the same trusted third-party and list their unique digital items on the trusted third-party server. When the items are listed, each party gains a listing on the trusted third-party server. The party at client 404 gains a listing for unique digital item 410, while the party at client 406 gains listings for the payment and deposit. The parties at clients 404 and 406 may inspect the items using the descriptor information contained in the listings.

If the parties cancel, the retrieval tags may be used to obtain the items that they placed into storage. If the parties agree to a transaction, they may exchange listings on the trusted third-party server, and then redeem the listings to gain possession of the unique digital items.

Alternatively, the parties may decide to conduct a transaction that involves the temporary ownership of unique digital items. Again, the parties mutually agree to use the same trusted third-party and list their unique digital items on the trusted third-party server. A lease contract is drawn up on the trusted third-party server, and all parties must agree to the terms and conditions of the lease contract. These terms may spell out penalties for late return, automatic return of the leased items upon lease expiration, marking leased items untradeable on the storage server, or substitution of a sufficiently similar unique digital item in place of the leased item.

Turning now to FIGS. 5A-5F, diagrams illustrating an example of a transaction for trading unique digital items are depicted in accordance with a preferred embodiment of the present invention. In this example, in FIG. 5A, party A 500 wishes to trade with party B 502. Prior to the transaction or trade, party A 500 owns item A 504 in account 506 on server D 508. Server D 508 is a storage server in these examples. Party B 502 owns item B 510 in account B 512 on server D 508. These two accounts are storage accounts.

Both parties mutually agree to use a trusted third-party, such as escrow service C 511. Escrow service C 511 is a trusted third-party server in this example. As illustrated, party A 500 has escrow account A 514 in escrow accounts 516 on escrow service C 511. Party B has escrow account 518 in escrow accounts 516 on escrow service C 511. These accounts are trusted third-party accounts which, in these examples, contain a list of all storage accounts associated with the trusted third-party account. An example of an entry in this list is a reference to the storage account ID 506 stored along with the name of server D 508.

Figure 5A:
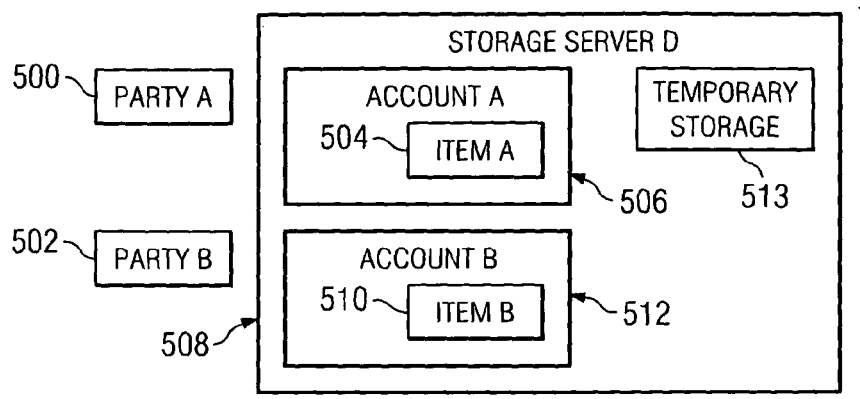
FIGS. 5A-5F are diagrams illustrating an example of a transaction for trading unique digital items in accordance with a preferred embodiment of the present invention.
Figure 5B:
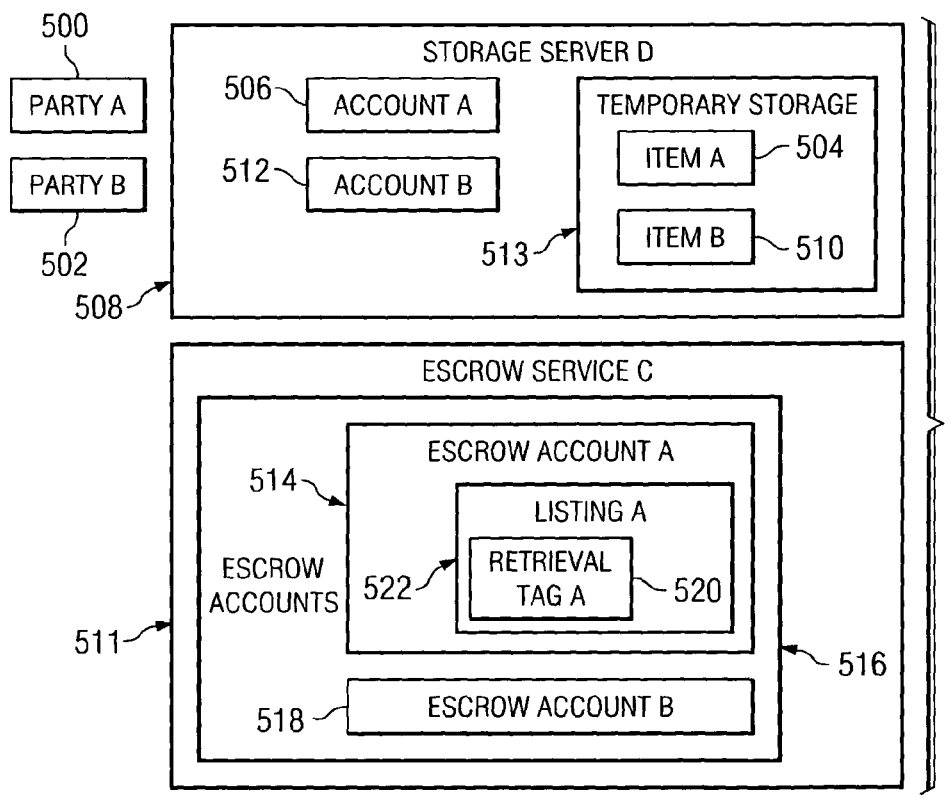
Figure 5C:
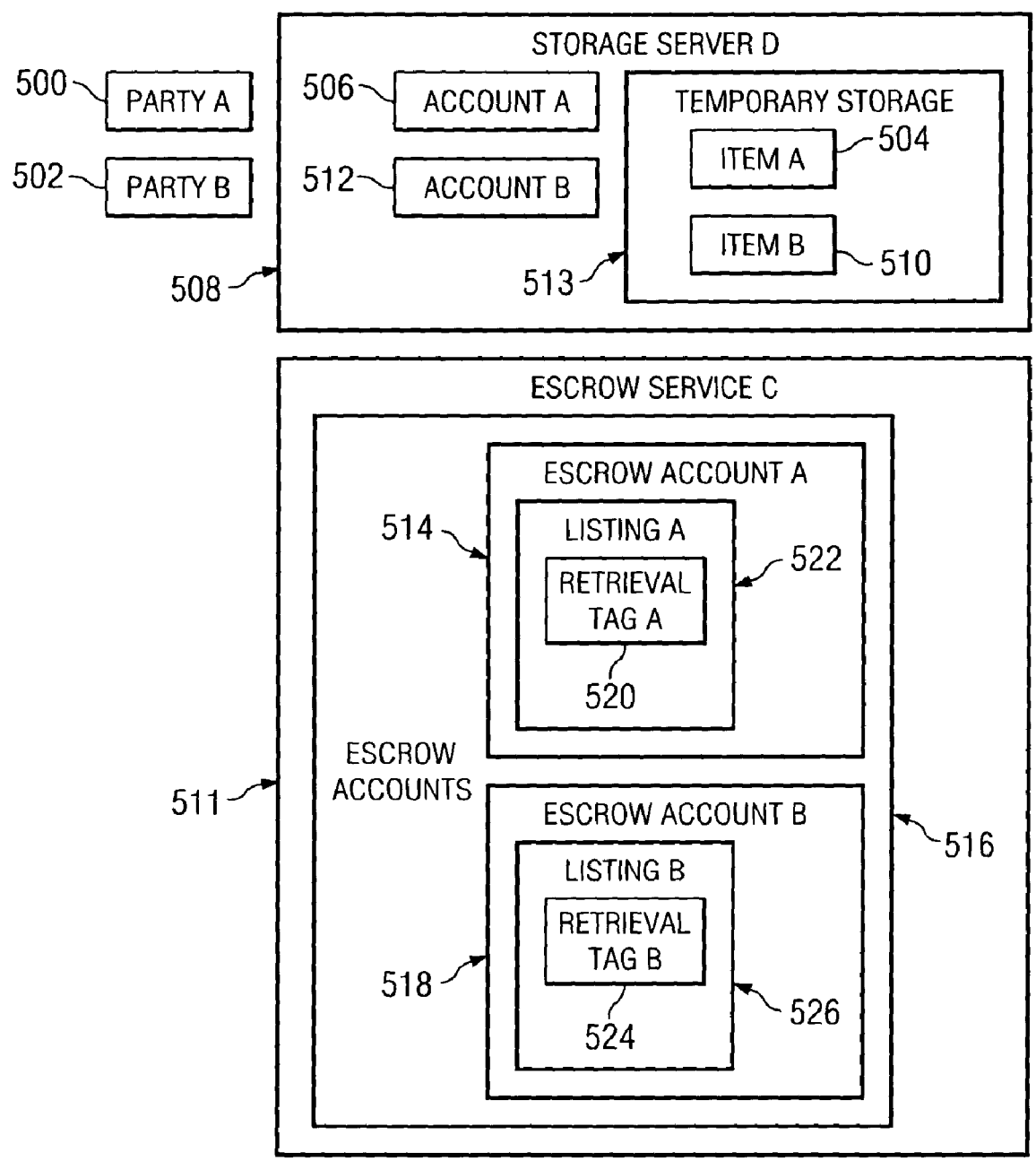

Server D 508 includes temporary storage 513, which is a storage account. In FIG. 5B, party A 500 logs onto account A 506 on server D 508 and instructs server D 508 to place item A 504 into escrow, choosing escrow service C 511. In response, server D 508 transfers item A 504 into temporary storage 513. Server D 508 also generates retrieval tag 520 and sends this tag to escrow service C 511 as part of an escrow listing request. In response to receiving this request, listing A 522 appears in escrow account A 514 using a digital item descriptor, as described above. Party A 500 may choose to place additional items into escrow.

In a similar fashion, party B 502 may log onto account B 512 and request server 508 to transfer item B 510 into escrow. In response to such a request, server D 508 transfers item B 510 into temporary storage 513 in FIG. 5C. Temporary storage 513 is an example of a storage account. Server D 508 generates retrieval tag 524 and sends this retrieval tag to escrow service C 511 in a listing request. When escrow service C 511 receives the listing request, listing B 526 is created in escrow account B 518. Party B 502 may chose to place additional unique digital items into escrow service C 511.

Figure 5D:
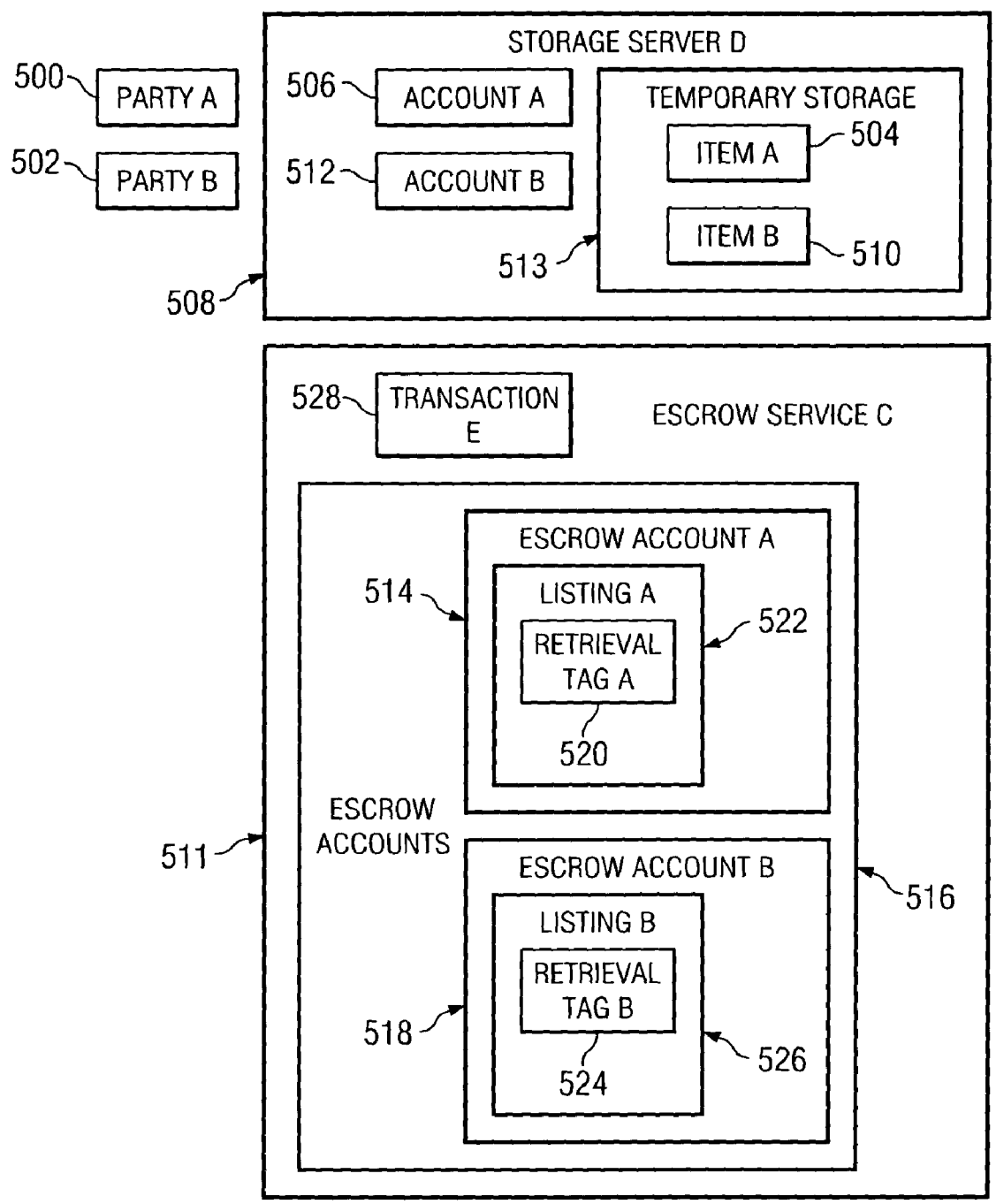

In FIG. 5D, party A 500 logs onto escrow service C 511 and creates transaction E 528. Party B 502 also logs onto escrow service C 511 and locates transaction E 528. Transaction E 508 may be located in a number of different ways, such as searching for a transaction name provided by party A 500 or by searching for transactions that contain party A 500 on escrow service C 511.

At this point, party A 500 and party B 502 may negotiate terms and may add and remove items that are part of transaction E 528. For example, item A 504 and item B 510 may be items that are added to transaction E 528 by A 500 and party B 502, respectively.

Transaction E 528 has different commitment states in these examples. In the unlocked state, party A 500 may freely add or remove items owned by party A 500 from transaction E 528. Party B 504 may freely add or remove items owned by party B 504 from transaction E 528. In these examples, a graphical user interface is used by party A 500 to lock one side of transaction E 528 at any time. Similarly, party B 502 may lock transaction E 500 at any time. With a partial lock, at least one, but not all parties have clicked "lock" on the graphical user interface. Any attempt to change the deal (add or remove items) will cause transaction E 528 to revert back to the unlocked state. In the locked state, all parties have clicked "lock".

Thereafter, the "commit" button is enabled. Party A 500 and party B 502 may inspect transaction E 528 prior to committing the transaction. Party A 500 may click the "commit" button to commit one side of transaction E 528 at any time. Similarly, party B 502 may commit to transaction E 528 at any time. A partial commit state in transaction E 528 occurs when at least one, but not all parties have clicked the "commit" button on their screens. A committed state occurs for transaction E 528 when all of the parties have clicked the "commit" button. Transaction E 528 is attempted. If transaction E 528 completes, the parties receive a confirmation message and their accounts now contain the newly acquired items listed. If a problem occurs, an error message is displayed and the accounts still list the original (pre-trade) contents.

If an error occurs or all parties exit the transaction, no transaction occurs, and all parties retain their pre-trade listings in their escrow accounts. The listings in these accounts may be redeemed at any time for the unique digital items.

Figure 5E:
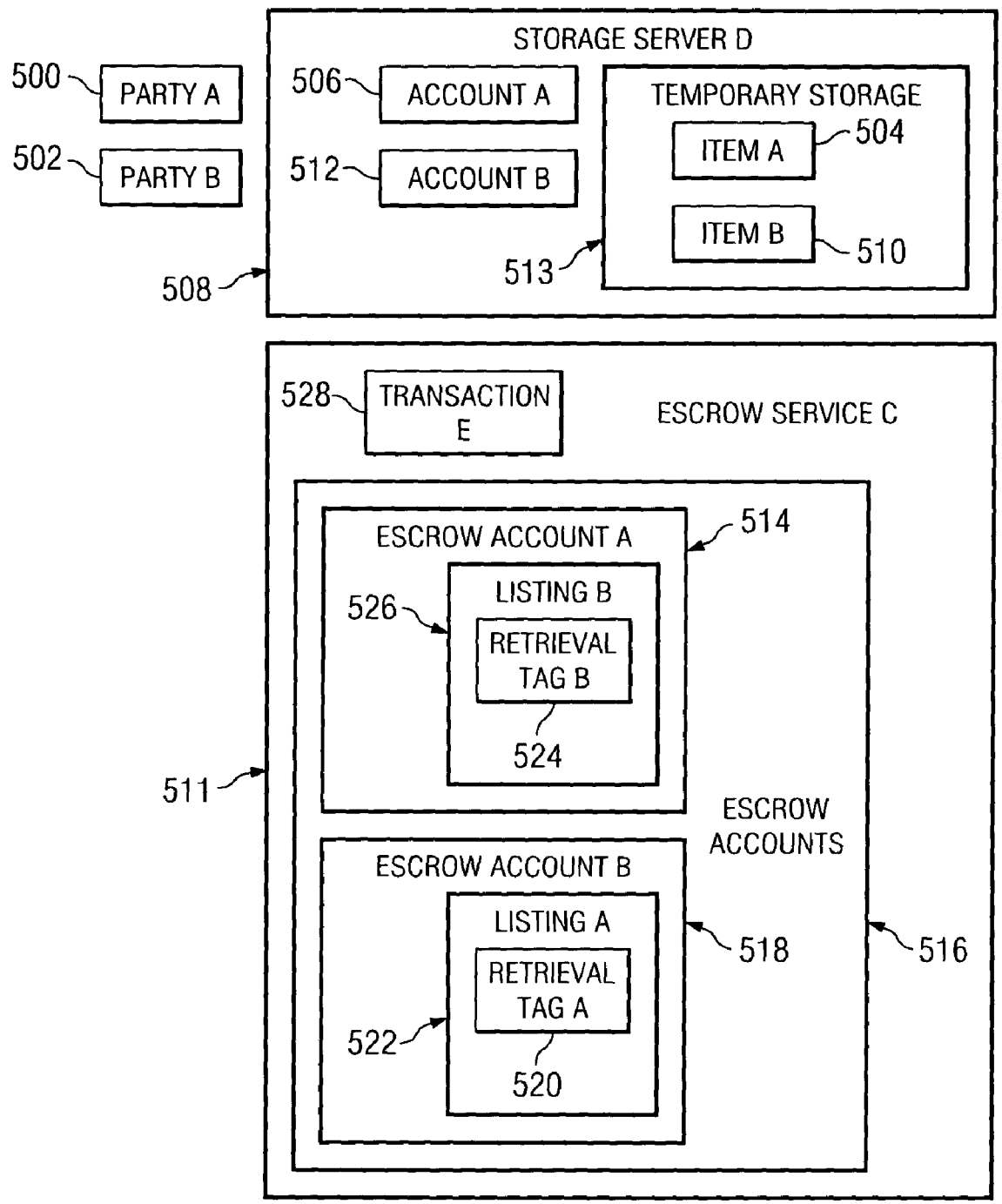

Assuming the transaction, transaction E 528, between party A 500 and party B 502 reaches the committed state, escrow service C 511 transfers listing A 522 from escrow account A 514 into escrow account B 518, as illustrated in FIG. 5E. Additionally, listing B 526 in escrow account B 518 is transferred into escrow account A 514.

Figure 5F:
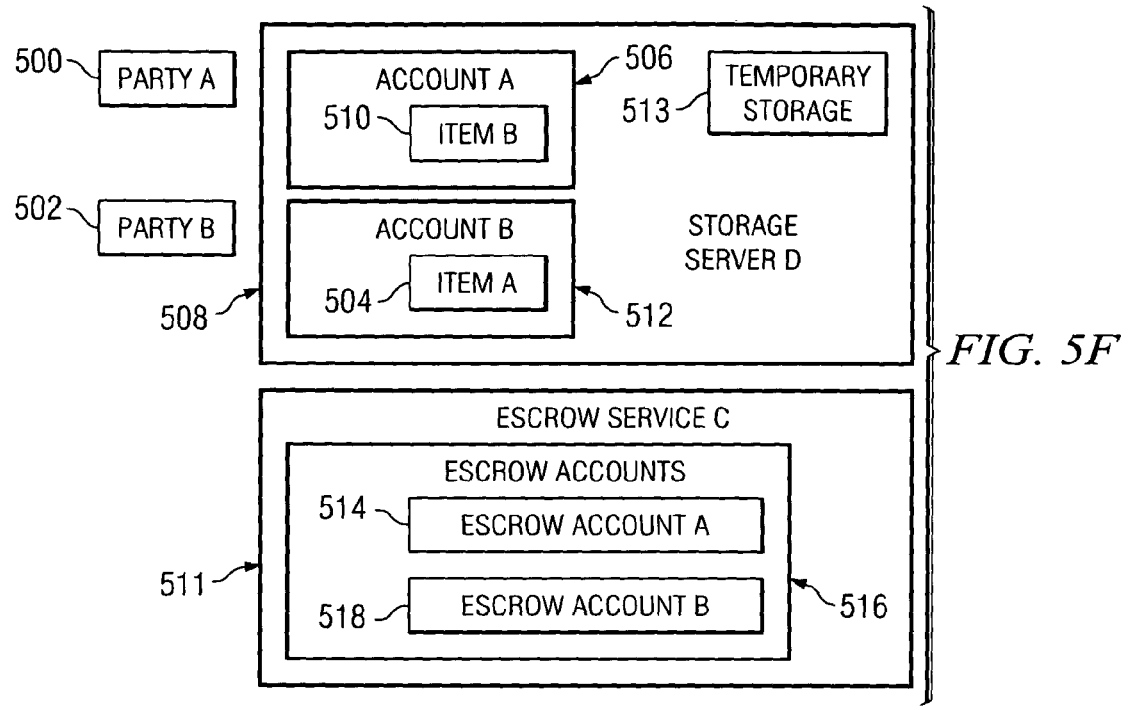

Party A 500 may then redeem or receive item B 510 from escrow in escrow service C 511 by designating a destination account, account A 506 on server D 508. Escrow service C 511 sends a redemption request to server D 508, which includes retrieval tag B 524 and an identification of account A 506. In response, server D 508 transfers item B 510 into account A 506 as illustrated in FIG. 5F to illustrate a final state after redemption has occurred.

Similarly, party B 502 may then redeem or receive item B 504 from escrow in escrow service C 511 by indicating a destination account, account B 512 on server D 508. Escrow service C 511 sends a redemption request to server D 508, which includes retrieval tag A 520 and an identification of account A 506. In response to receiving this request, server D 508 transfers item A 504 into account B 506. Redemption occurs when item A 504 is moved into account B 506. Once the redemption is done, the retrieval tag is invalidated on servers 508 and 511. In other words, this tag may no longer be used for future redemption requests.

Thus, the example exchange illustrated in FIGS. 5A-5F demonstrates a mechanism for exchanging items in which items are placed into escrow prior to committing to the transactions. In particular, the use of a retrieval tag for unique digital items provides a way to identify unique digital items that are to be transferred using an trusted third-party service. Further, the example illustrated in FIGS. 5A-5F, transfer a unique digital item to an account of a first party in response to the transfer of another unique digital item to another party. Additionally, a transfer of the unique digital item to the account of the first party may occur through a payment of money or through a performance of a selected action. This action may be, for example, an execution of another transaction or a contract. In such a case, the performance may be verified through a confirmation by a trusted third party or by both parties indicating that the performance of this action has occurred. Further, fraud is prevented through the use of a trusted third-party and satisfaction of all parties is ensured by the ability to inspect the items prior to committing the trade.

Turning now to FIG. 6A-6E, diagrams illustrating an example of a lease transaction for a unique digital item are depicted in accordance with a preferred embodiment of the present invention. In this example, in FIG. 6A, party A 600 wishes to rent item B 602 in account B 604 on server 606 from party B 608 for a period of time using payment A1 610 and deposit A2 612 in account A 614. Temporary storage 616 is used to hold these items when a lease transaction is started between party A 600 and party B 608. Server 606 is a storage server. Account A 614, account B 604, and temporary storage 616 are storage accounts in these examples.

Both parties agree on a trusted third-party, such as leasing service 618. Leasing service 618 is a service similar to escrow service C 511 in FIG. 5. This service is a trusted third-party service. Both services may be implemented with software on a data processing system, such as data processing system 200 in FIG. 2. In this example, party A 600 has set up lease account A 620 on leasing service 618, while party B 608 has set up lease account B 622 on leasing service 618. These lease accounts are trusted third-party accounts.

Figure 6A:
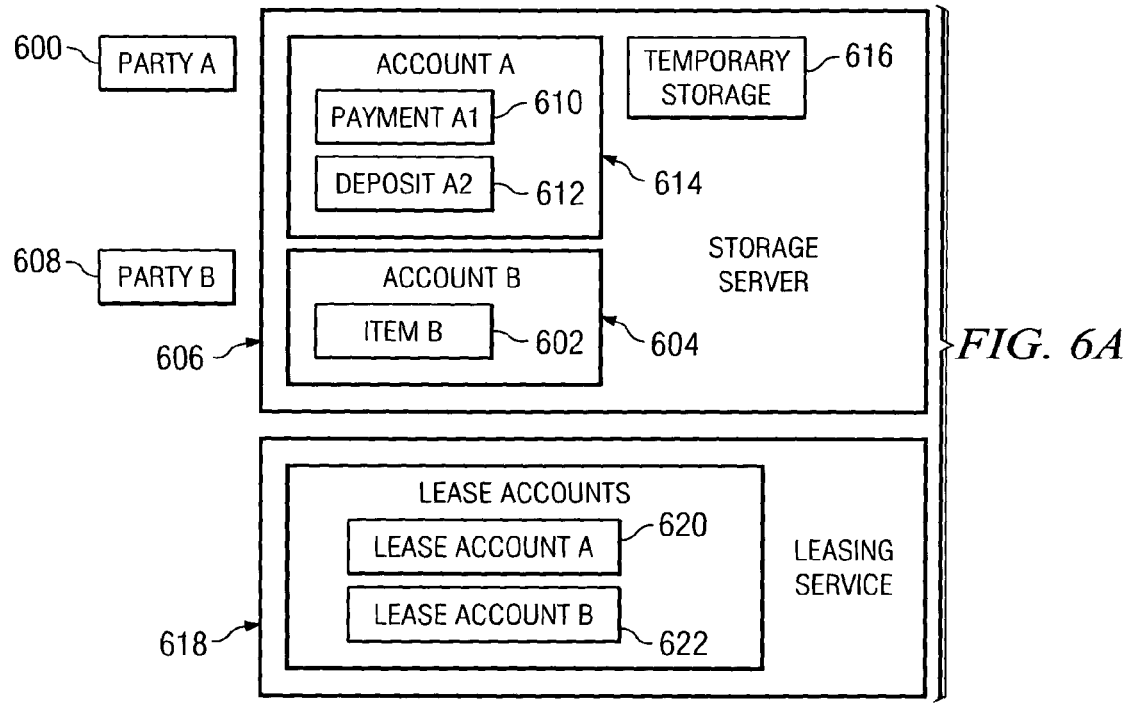
FIGS. 6A-6E are diagrams illustrating an example of a lease transaction for a unique digital item in accordance with a preferred embodiment of the present invention.
Figure 6B:
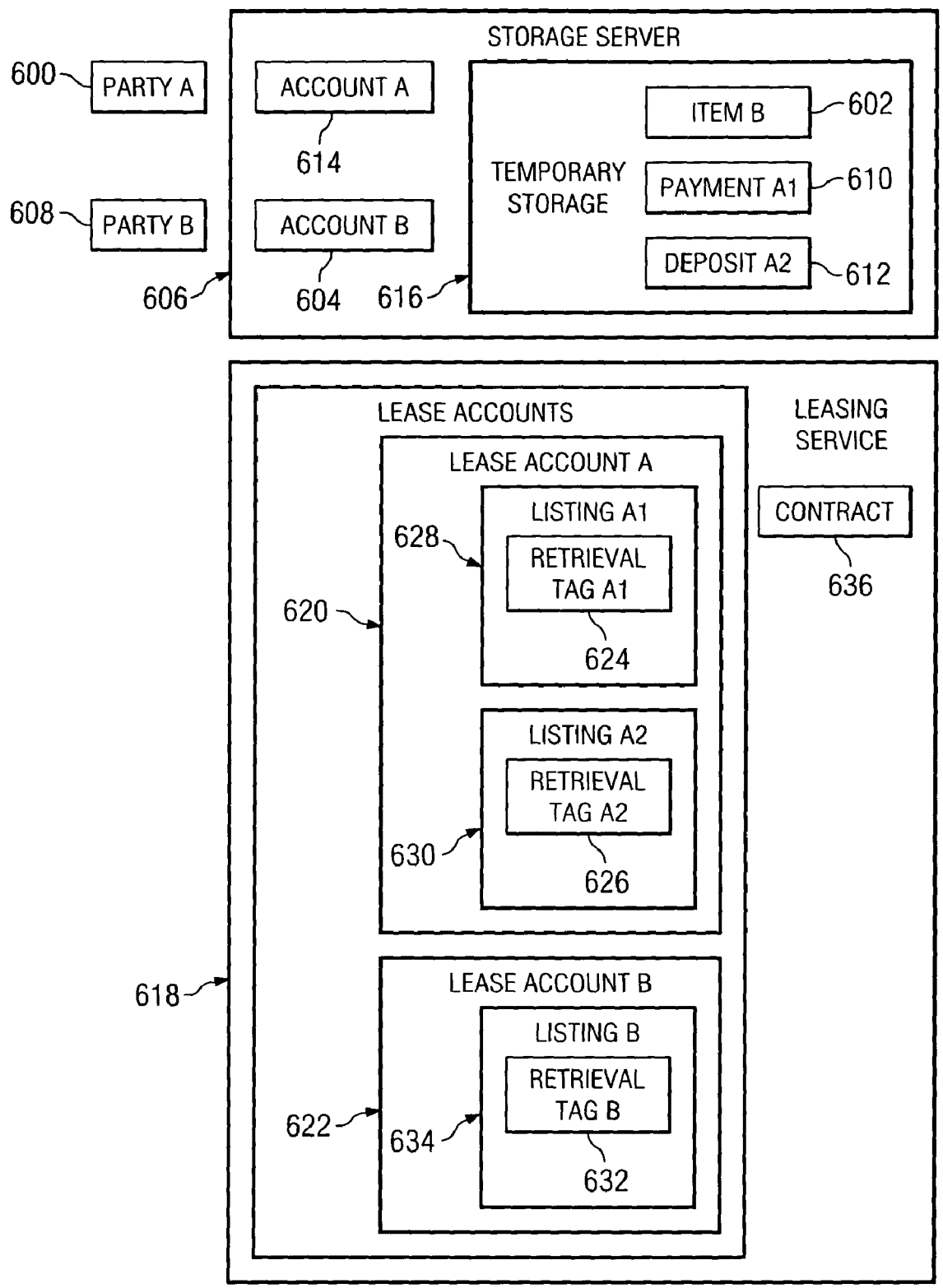

Party A 600 logs onto account A 614 on server 606 and instructs server 606 to make payment A1 610 and deposit A2 612 available to leasing service 618, which was selected by a list of valid services by party A 600. In response to this instruction, server 606 moves payment A1 610 and deposit A2 612 into temporary storage 616, as illustrated in FIG. 6B. Server 606 generates and sends retrieval tag A1 624 and retrieval tag A2 626 to leasing service 618. These tags are part of a listing request in these examples. In response to receiving these retrieval tags, leasing service 618 generates listing A1 628 and listing A2 630 in lease account A 620.

In a similar fashion, party B 608 logs onto account B 604 on server 606 and requests server 606 to make item B 602 available to leasing service 618. As a result, server 606 transfers item B 602 from account B 604 to temporary storage 616. Server 606 also generates return tag B 632 and sends this return tag in a listing request to leasing service 618. In turn, leasing service 619 generates listing B 634 in lease account B 622.

Party A 600 also logs onto leasing service 618 and creates contract 636, as shown in FIG. 6B. Contract 636 can take many forms. In the depicted examples, this contract includes the name of the server holding the item or items being rented, a URL address for the Web service for the server holding the item or items, a name of the server holding the deposit, and a URL address for the Web service for the server holding the deposit. Additionally, contract 636 also includes a contract ID number, an account ID for the lessor, an account ID for the lessee, retrieval tags for items being rented, a retrieval tag for the deposit, a retrieval tag for the payment, and contract terms and conditions. These conditions may include, for example, a time period or expiration date for the lease or rental, as well as terms detailing any sort of penalties for late or non-return of the item.

Party B 608 may find contract 636 on leasing service 618 by searching for a contract name provided by party A 600 or searching for contracts that contain party A 600 on leasing service 618. At this point, party A 600 and party B 608 may negotiate terms and conditions for contract 636. The terms and conditions may change depending on the negotiations. In this negotiation phase, contract 636 has a number of states. In the unlocked state, parties may freely change terms and conditions of the contract. A graphical user interface is used by party A 600 to lock one side of contract 636 at any time. In a similar fashion, party B 608 may lock contract 636 at any time. A partial lock state occurs when at least one, but not all parties, have selected the "lock" button. Any attempt to change the terms or conditions of contract 636 will change the state of contract 636 back to the unlocked state.

A locked state for contract 636 occurs when all of the parties in this example have selected the "lock" button on their screens. At this point, a "sign contract" button is enabled on the screens of all parties. At this point, the parties may inspect contract 636 prior to signing. Party A 600 may select the "sign contract" button to agree to the contract at any time. Party B 608 may perform similar actions. Contract 636 is in a partially signed state when at least one party, but not all parties have selected the "sign contract" button.

Contract 636 enters the signed state when all parties in this example have selected the "sign contract" button. At this point, the parties receive a confirmation message and their lease service accounts are updated to include listings of the newly acquired items. If a problem occurs in the process, an error message is presented to the parties, and the accounts continue to list the original contents. The contents also remain in the original accounts if all parties exit without signing contract 636. In such a case, contract 636 is discarded and no exchange is made.

Assuming contract 636 reaches a signed state, leasing service 618 transfers listing B 634 from lease account B 622 to account A 620, along with copy A 635 of contract 636. Additionally, leasing service 618 transfers listing A1 628 for payment A1 610 into account B 622, as well as copy B 637 of contract 636. Party A 600 may then redeem or obtain item B 602 from leasing service 618. Party A 600 indicates a destination account, account A 614 on server 606.

Figure 6C:
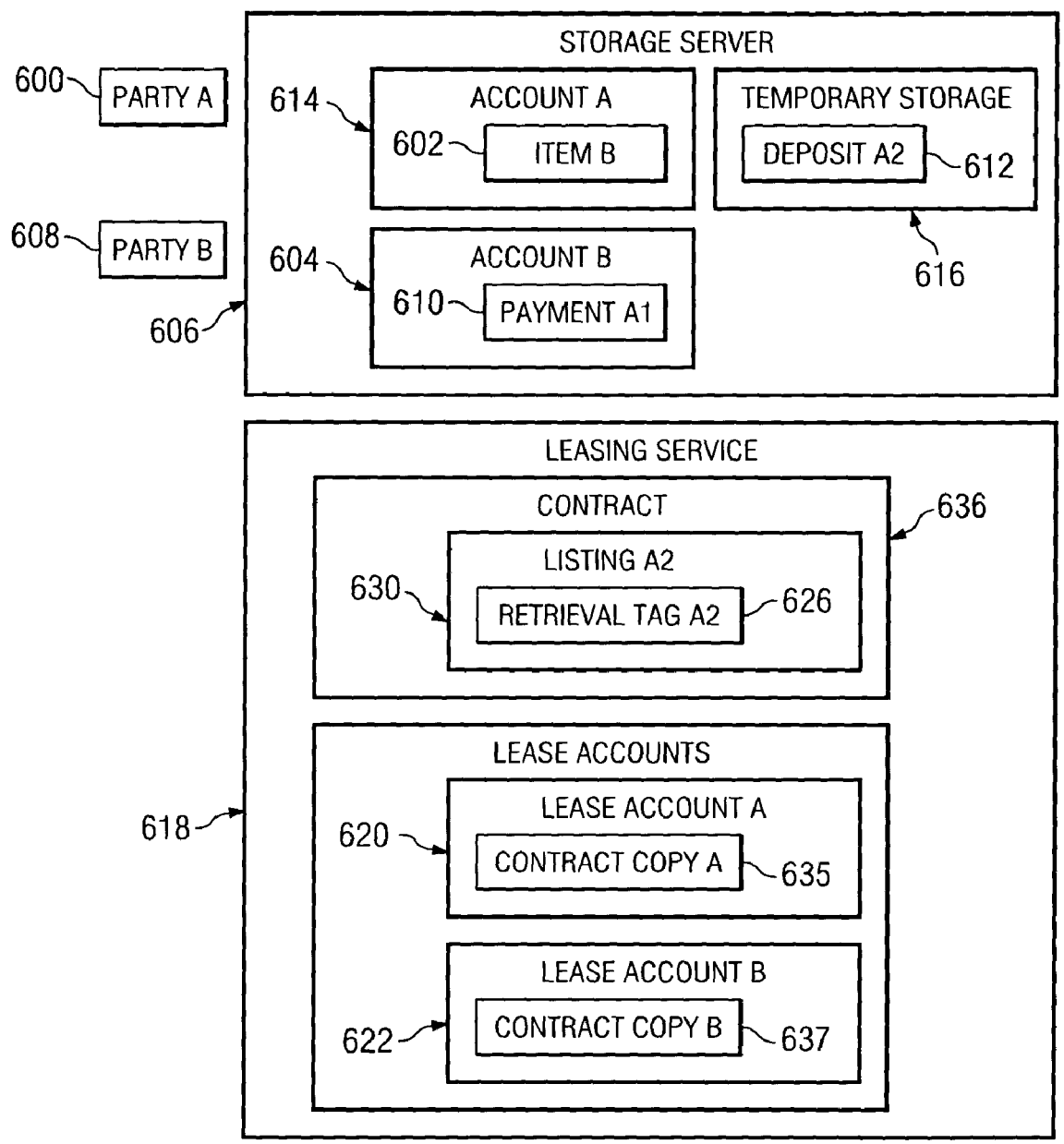
Figure 6D:
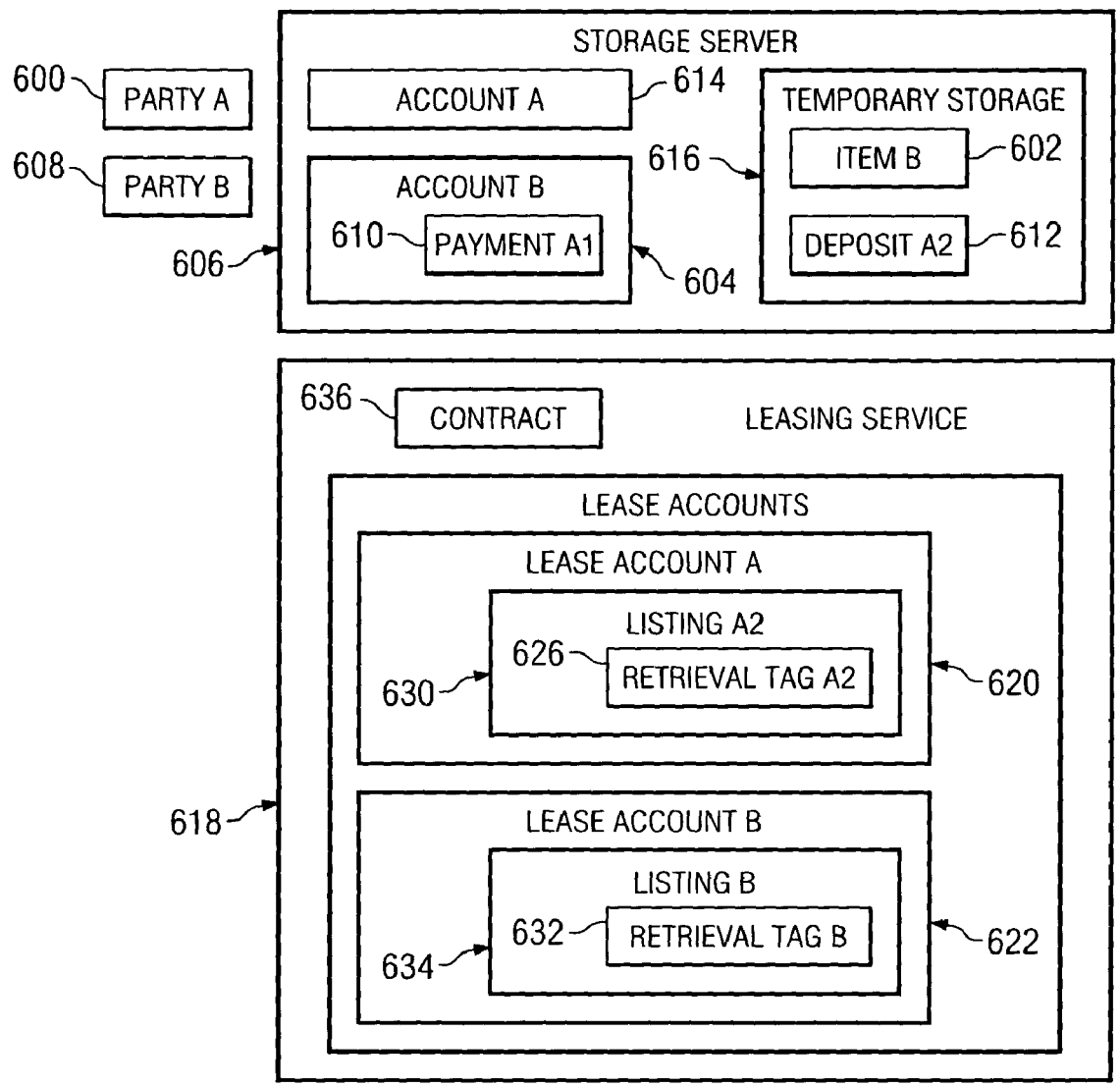
Figure 6E:
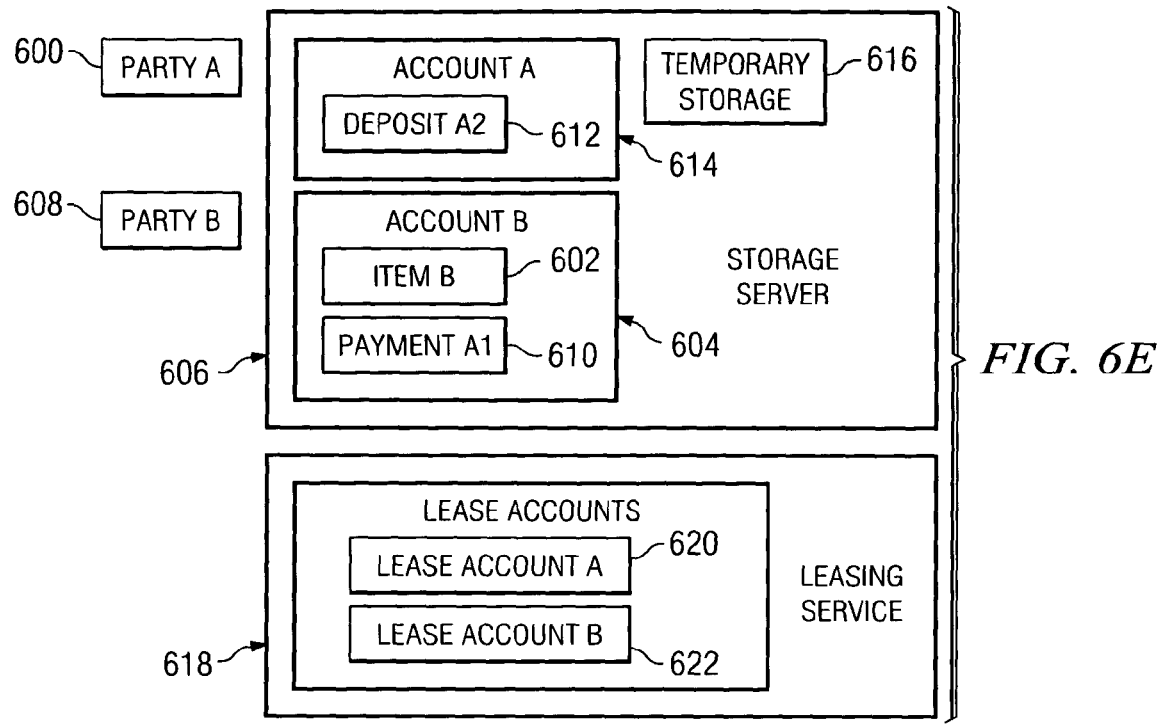

Leasing service 618 then sends a redemption request to server 606 with retrieval tag B 632 and identification of account A 614. In response to receiving this request, server 606 transfers item B 602 from temporary storage 616 into account A 614, as shown in FIG. 6C. Party B 608 may redeem payment A1 610 from leasing service 618 by indicating a destination account, account B 604 on server 606. In response, leasing service 618 sends a redemption request to server 606 in which the request includes retrieval tag B 632 and an identification of account B 604. When this request is received by server 606, payment A1 610 is moved into account B 604, as illustrated in FIG. 6D. These redemption requests include the appropriate retrieval tags, as well as an identification of the destinations for the items associated with the tags.

At any time prior to the expiration, prior to the period of time for the lease, party A 600 may present item B 602 and copy A 635 of contract 636 to leasing service 618 and receive deposit 612. In this instance, item B 602 is returned to account B 604 and party A 600 receives deposit A2 612 in account A 614 in FIG. 6E. If party A 600 fails to return item B 602 prior to the expiration, party B 608 may present copy B 637 of contract 636 to leasing service 618 and receive all or some portion of deposit 612. In this manner, a mechanism of the present invention provides a system for leasing unique digital items. This mechanism involves placing a deposit with a trusted third-party.

The examples illustrated in FIGS. 5A-5F and FIGS. 6A-6E depict transactions in which items and payments occur on the same server. These examples also may be applied to the generation of digital rights in which a digital right is a digital representation of a right to claim goods or services. For example, a digital right may be electronic coupons, loyalty points, or electronic gift certificates. The digital rights may be held by different issuing sources and may be exchanged between various parties holding those rights. The retrieval tags in these examples represent the unique digital items, which may take many forms, such as, for example, real estate in an online game, a character in an online game, or a digital right. Also, the examples depict exchanges and leases with two parties. These processes may be applied to larger numbers of parties than the two illustrated in the figures.

Further, the processes illustrated in these examples may be applied to transfers that occur over different servers. In the examples in FIGS. 5A-5F, it is not necessary for item A 504 and item B 510 to reside on the same storage server D 508. If different storage servers are used in a transaction, each party has accounts for each storage server. A party may trade a listing on one storage server in exchange for a listing on a different storage server. The newly acquired listing is redeemed on its respective storage server.

Figure 7:
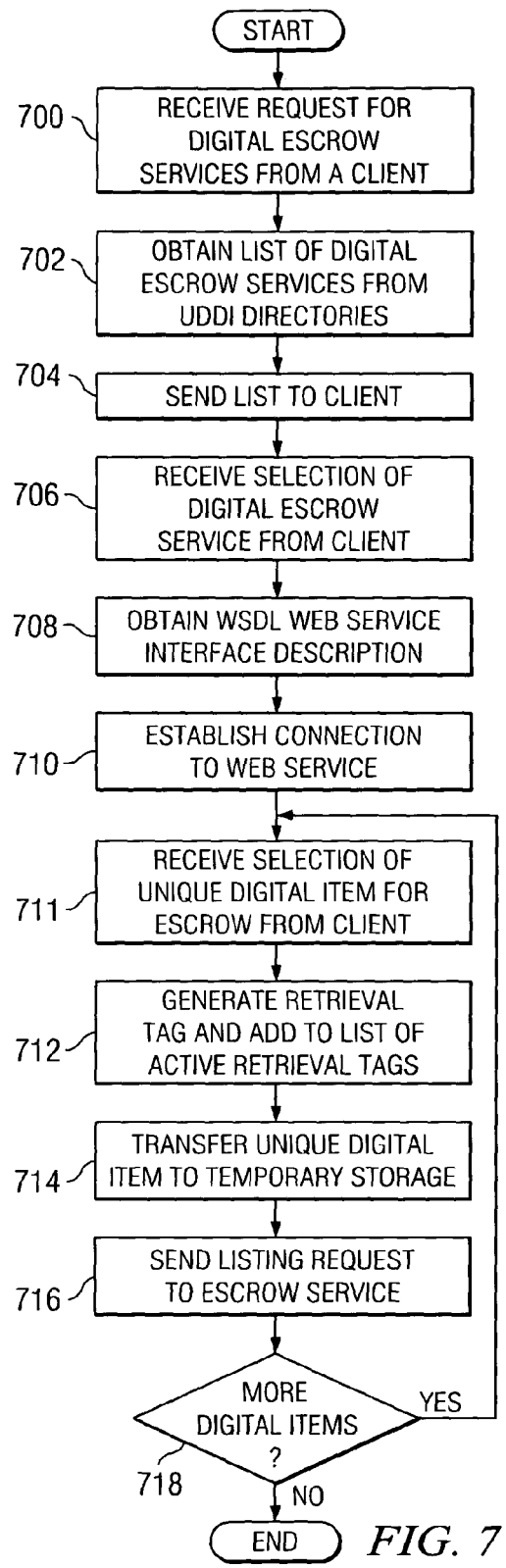
FIG. 7 is a flowchart of a process for placing a unique digital item into escrow in accordance with a preferred embodiment of the present invention.

Turning next to FIG. 7, a flowchart of a process for placing a unique digital item into escrow is depicted in accordance with a preferred embodiment of the present invention. The process illustrated in FIG. 7 may be implemented in a server process, such as server process 402 in Web server 400 in FIG. 4.

The process begins by receiving a request for digital escrow services from a client (step 700). In response to receiving this request, a list of digital escrow services is obtained from UDDI directories (step 702). This list is sent to the client (step 704). A selection of a digital escrow service from the list is received from the client (step 706). In response to receiving this selection, a WSDL Web service interface description is obtained for the selected service (step 708). A connection is then established with the Web service (step 710). In this example, the Web service is the selected digital escrow service identified by the client. This connection is a secure connection using a protocol, such as SSL.

After the connection has been established, a selection of a unique digital item for escrow is received from the client (step 711). Then a retrieval tag is generated for the unique digital item and the tag is added to a list of active retrieval tags (step 712). This retrieval tag is associated with the unique digital item and is used for transferring this item between accounts used for holding the unique digital item. The unique digital item is then transferred to a temporary storage account (step 714).

A listing request is sent to the escrow service in which the listing request includes the retrieval tag (step 716). Next, a determination is made as to whether additional unique digital items are to be escrowed (step 718). If additional unique digital items are to be escrowed, the process returns to step 711 as described above. If no additional unique digital items are to be escrowed, then the process terminates thereafter.

Figure 8:
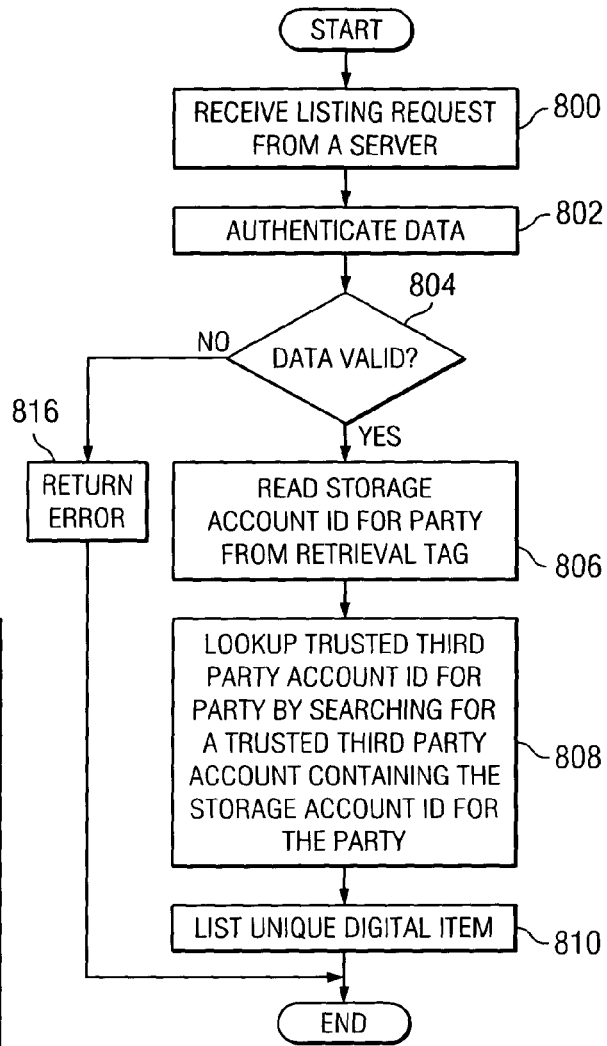
FIG. 8 is a flowchart of a process used in transferring a unique digital item to a trusted third-party in accordance with a preferred embodiment of the present invention.

Turning next to FIG. 8, flowchart of a process used in transferring a unique digital item to a trusted third-party is depicted in accordance with a preferred embodiment of the present invention. The process illustrated in FIG. 8 may be implemented in a process such as trusted third-party server process 416 in escrow server 418 in FIG. 4.

The process begins by receiving a listing request from a server (step 800). This listing request includes a retrieval tag for a unique digital item that is to be escrowed. After this listing request is received, the data in the retrieval tag is authenticated (step 802). The authentication is performed to ensure that the data actually sent from the server has not been altered or tampered. A digital signature is sent with the data. This authentication may be performed by comparing the digital signature with a published public key for the server from which the data was received.

A determination is made as to whether the data in the listing request is valid (step 804). If the data is valid, the process then reads a storage account ID for the party from the retrieval tag (step 806). A trusted third-party account is identified by searching for a trusted third-party account containing the storage account ID for the party (step 808). After the account is found, the unique digital item is listed (step 810) with the process terminating thereafter. The unique digital item may be listed such that the parties can examine or verify the item that has been escrowed. This listing is generated based on data received from the data on the unique digital item from the server back in step 800. By listing the unique digital item, such that the item may be inspected, the chance of fraud is reduced using this mechanism in the present invention.

Turning back to step 804, if the data in the listing request is not valid, an error is returned to the server (step 816), with the process terminating thereafter.

Figure 9:
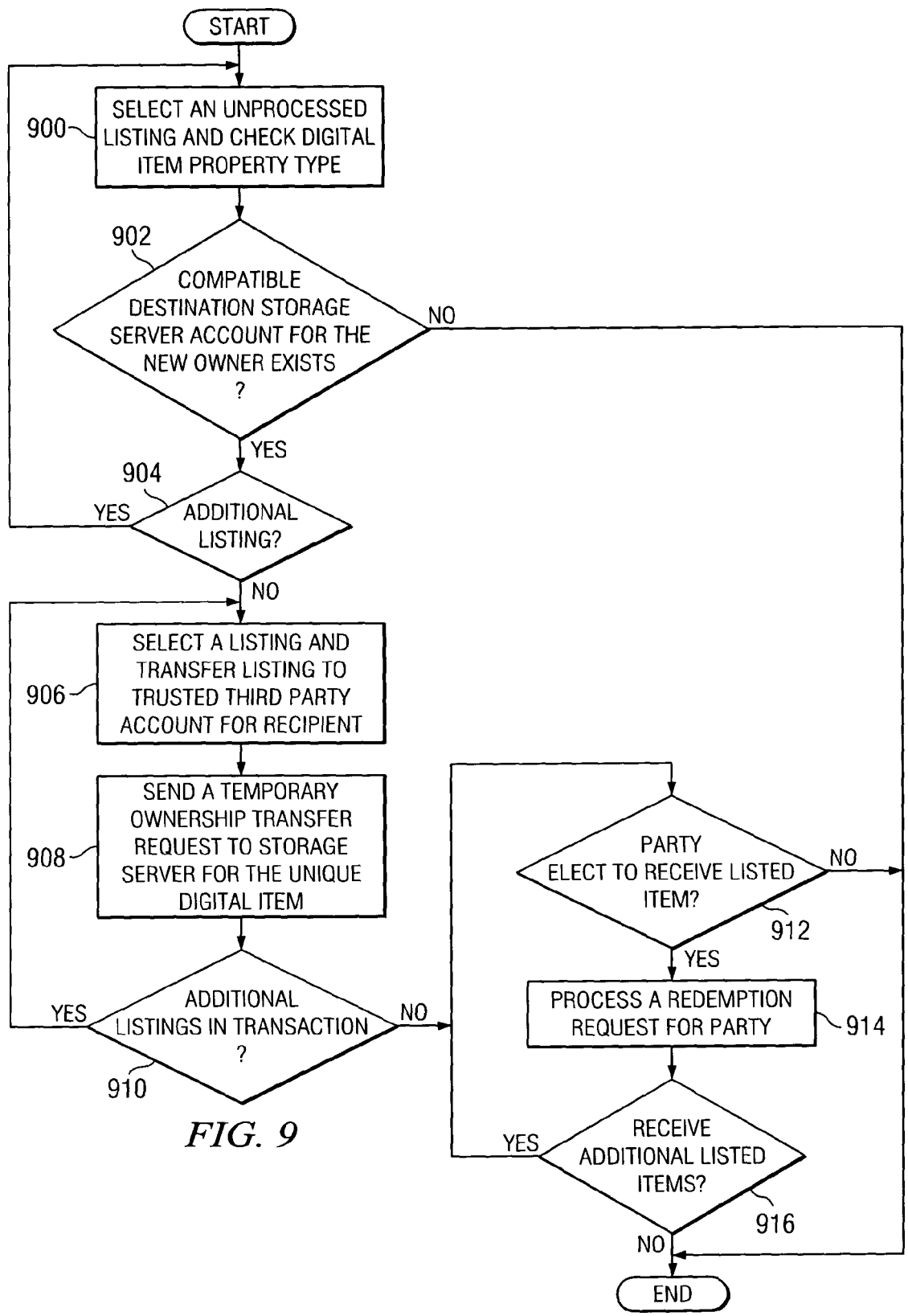
FIG. 9 is a flowchart of a procedure by which a trusted third-party processes a transaction in accordance with a preferred embodiment of the present invention.

With reference now to FIG. 9, a flowchart of a procedure by which a trusted third-party processes a transaction is depicted in accordance with a preferred embodiment of the present invention. The process illustrated in FIG. 9 may be implemented in a trusted third party server, such as escrow 418 in FIG. 4. This process is initiated when a transaction has reached a committed state, as described above.

The process begins by selecting an unprocessed listing and checks the digital item property type for the unprocessed listing (step 900). Next, a determination is made as to whether the destination storage server account for the new owner exists (step 902). If the destination storage server account exists, a determination is made as to whether additional unprocessed listings are present (step 904). If additional unprocessed listings are present, the process returns to step 900 as described above.

Otherwise, a listing is selected and the listing is transferred to a trusted third party account for the recipient (step 906). A temporary ownership transfer request is sent to the storage server for the unique digital item (step 908). Thereafter, a determination is made as to whether additional listings are present for the transaction (step 910). If additional listings are present for the transaction, the process returns to step 906 as described above. If, however, additional listings are not present, a determination is made as to whether the party, the new owner, has elected to receive the item (step 912). If the party has elected to receive the listed item, a redemption request is processed for the party (step 914).

Afterwards, a determination is made as to whether additional listed items have been received (step 916. If additional listed items have been received, the process returns to step 912 as described above. Otherwise, the process terminates. With reference again to step 912, if the party has not elected to receive the item, the process terminates.

Figure 10:
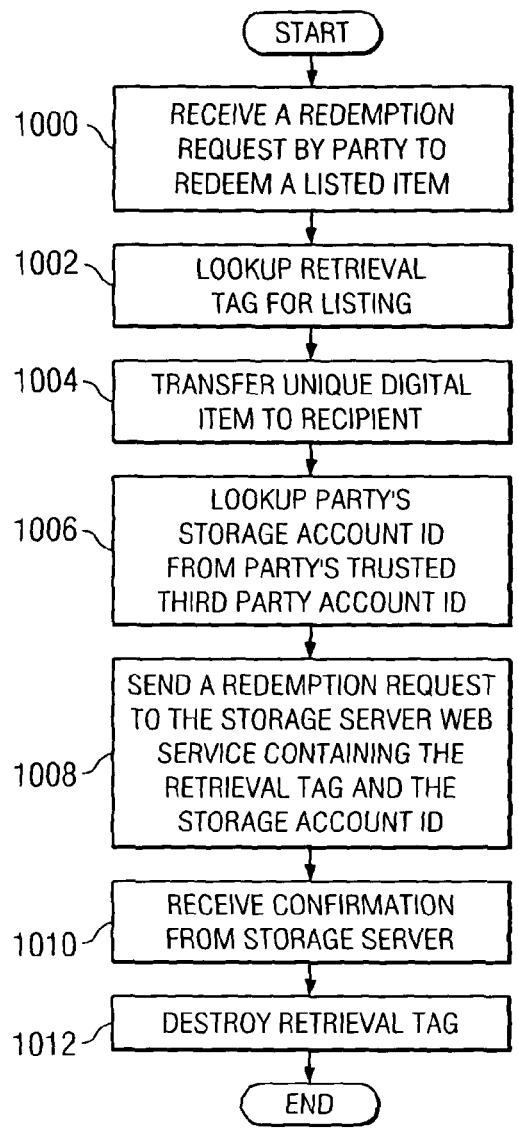
FIG. 10 is a flowchart of a procedure by which a trusted third-party server processes a redemption request in accordance with a preferred embodiment of the present invention.

Turning next to FIG. 10, a flowchart of a procedure by which a trusted third-party server processes a redemption request is depicted in accordance with a preferred embodiment of the present invention. The process illustrated in FIG. 10 may be implemented in a trusted third party server.

The process begins by receiving a redemption request to redeem a listed item (step 1000). A retrieval tag is looked up for the listing (step 1002). The unique digital item is then transferred to the recipient's account (step 1004).

Next, the recipient party's storage account ID is looked up from the party's trusted third party account ID (step 1006). A redemption request is sent to the storage server Web service in which the request includes the retrieval tag and the storage account ID (step 1008). A confirmation is received from the storage server (step 1010), and the retrieval tag is destroyed (step 1012) with the process terminating thereafter.

Figure 11:
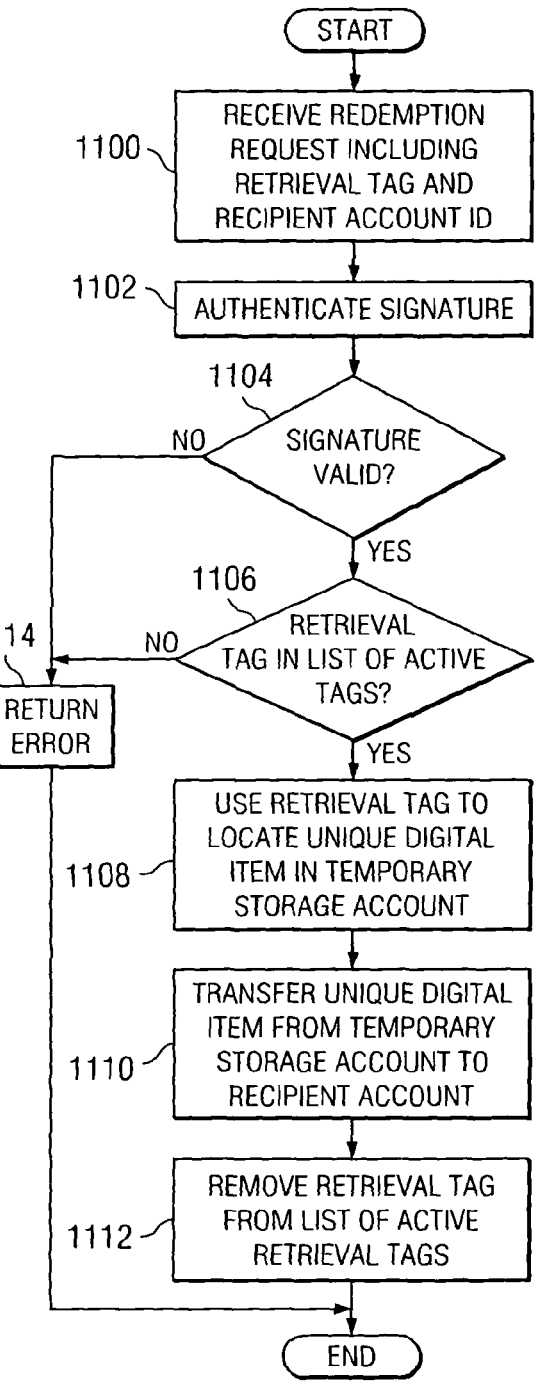
FIG. 11 is a flowchart of a procedure by which a storage server processes a redemption request in accordance with a preferred embodiment of the present invention.

With reference next to FIG. 11, a flowchart of a process for returning a unique digital item is depicted in accordance with a preferred embodiment of the present invention. The process illustrated in FIG. 11 may be implemented in a server, such as server process 402 in Web server 400 in FIG. 4. In these examples, this process may be initiated when the original owner of the unique digital item changes his or her mind with respect to a transfer and desires to retrieve the unique digital item from escrow. This process may be initiated by the original owner if the transaction allowing transfer of the unique digital item to the recipient has not occurred.

The process begins by receiving a redemption request in which the redemption includes a retrieval tag and a recipient account ID (step 1100). In this example, the recipient account ID is the account of the original owner of the unique digital item and is digitally signed. Thereafter, digital signature is authenticated (step 1102). A determination is made as to whether the signature is valid (step 1104). If the signature is valid, a determination is made as to whether the retrieval tag in the redemption request is in the list of active tags (step 1106). If the retrieval tag is in the list, the retrieval tag is used to locate the unique digital item in the temporary storage (step 1108). Thereafter, the unique digital item is transferred from the temporary storage account to the recipient account (step 1110). After the unique digital item has been transferred, the retrieval tag is removed from the list of active retrieval tags (step 1112), with the process terminating thereafter.

Turning back to step 1106, if the retrieval tag is not on the list of active retrieval tags, an error is returned (step 1114), with the process terminating thereafter. The process also returns an error in step 1114 if the signature is not valid in step 1104.

Figure 12:
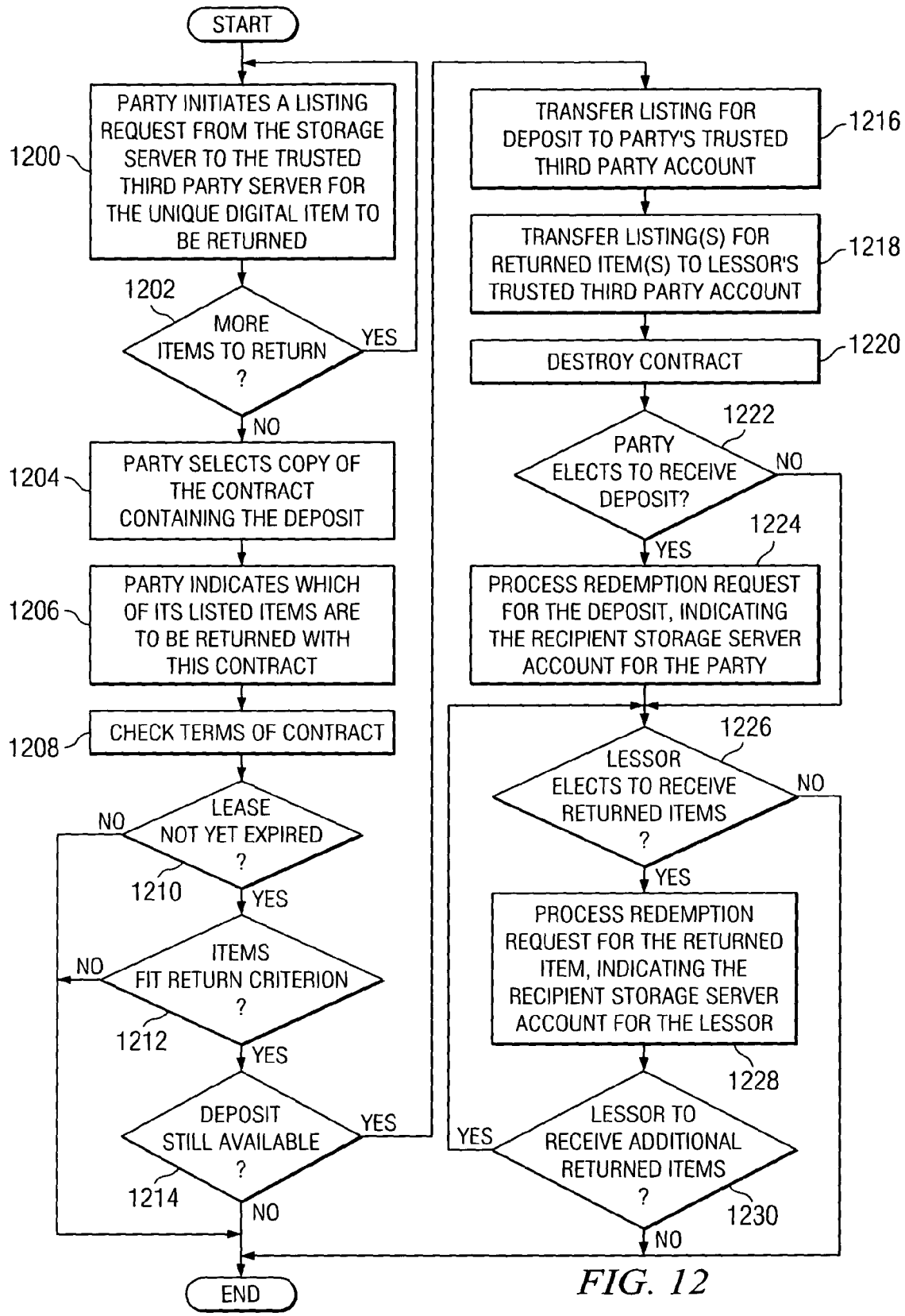
FIG. 12 is a flowchart of a process by which a party may return a unique digital item that is leased in accordance with a preferred embodiment of the present invention.

With reference now to FIG. 12, a flowchart of a process by which a party may return a unique digital item that is leased is depicted in accordance with a preferred embodiment of the present invention. The process illustrated in FIG. 12 may be implemented in a server, such as server process 402 in Web server 400 in FIG. 4.

The process begins by receiving an initiation of a listing request from a storage server at the trusted third party server for return of the unique digital item (step 1200). A determination is made as to whether additional items are to be returned (step 1202). If additional items are to be returned, the process returns to step 1200 as described above. Otherwise, a selection of a copy of a contract containing the deposit is received (step 1204). An indication is received from the party in which the indication indicates which of the party's listed items are to be returned with the contract (step 1206).

The terms of the contract are then checked (step 1208), and a determination is made as to whether the lease has not yet expired (step 1210). If the lease has not yet expired, a determination is made as to whether the item fits return criterion (step 1212). If the item fits the criterion, a determination is made as to whether the deposit is still available (step 1214). If the deposit is not available, the process terminates.

Otherwise, the listing for the deposit is transferred to a party's trusted third party account (step 1216). Then, listings for returned items are transferred to the lessor's trusted third party account (step 1218). The contract is then destroyed (step 1220).

Thereafter, a determination is made as to whether an election is received from the party to receive the deposit (step 1222). If the party elects to receive the deposit, a redemption request is processed for the deposit, indicating the recipient storage server account for the party (step 1224). Next, a determination is made as to whether the lessor elects to receive the returned items (step 1226). If the lessor elects to receive the returned items, a redemption request is processed for the returned item in which the request includes an indication of the recipient storage server account for the lessor (step 1228). Then, a determination is made as to whether the lessor is to receive additional returned items (step 1230). If additional returned items are not to be received by the lessor, the process terminates.

With reference again to step 1226, if the lessor does not elect to receive returned items, the process returns to step 1226. The process terminates if the party does not elect to receive the deposit in step 1222. With reference again to step 1212, if the item does not fit return criterion, the process terminates. The process also terminates in step 1210 if the lease has not yet expired.

Figure 13:
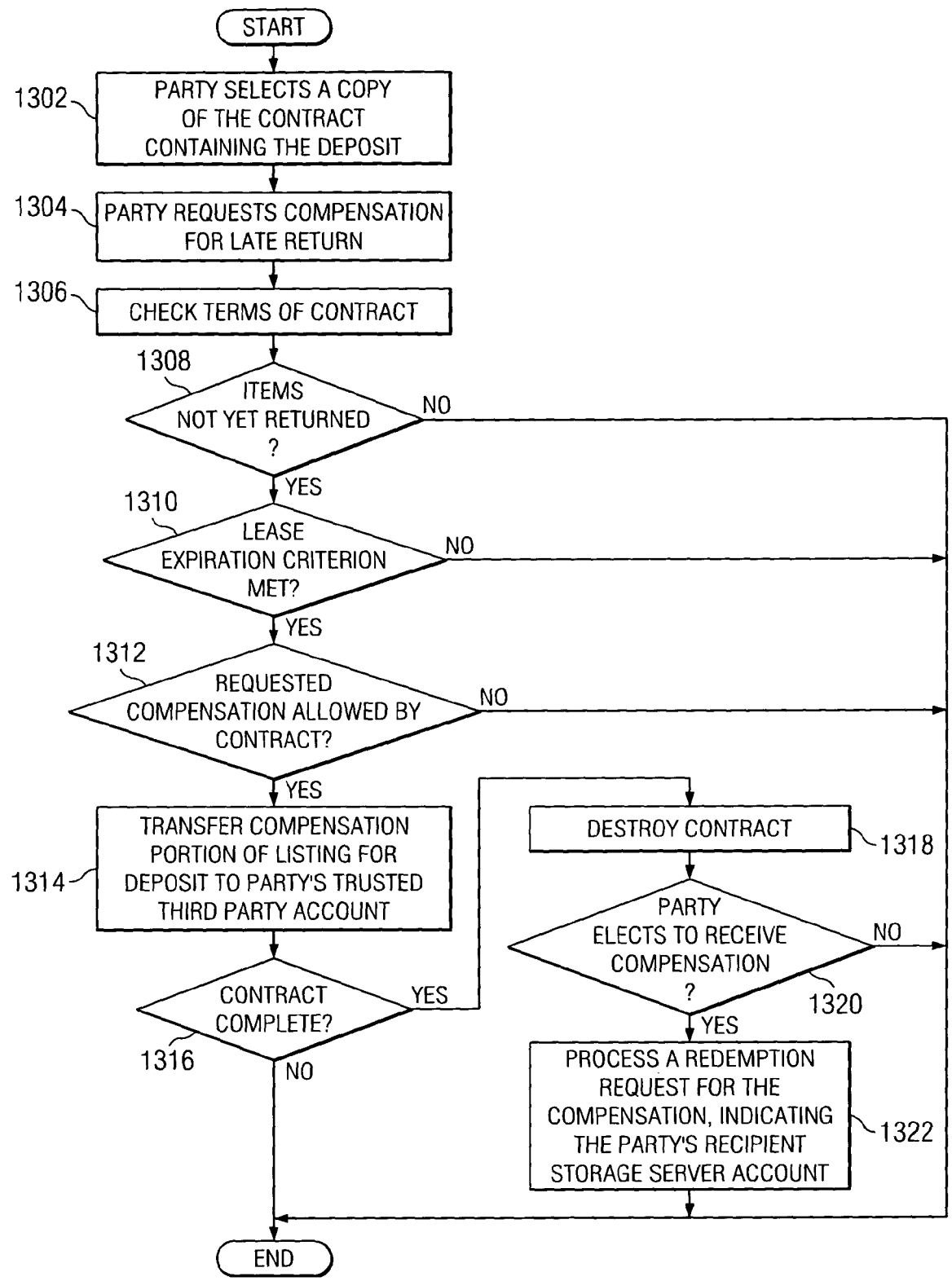
FIG. 13 is a flowchart of a process by which a party may request compensation for late return of a unique digital item that is leased in accordance with a preferred embodiment of the present invention.

In FIG. 13, a flowchart of a process by which a party may request compensation for late return of a unique digital item that is leased is depicted in accordance with a preferred embodiment of the present invention. The process as illustrated in FIG. 13 may be implemented in a server process, such as trusted third-party server process 416 in escrow server 418 in FIG. 4.

The process begins by receiving selection of a copy of a contract containing the deposit from a party (step 1302). After receiving a selection of the copy of the contract, a request is received from the party requesting compensation for the late return of the unique digital item (step 1304). The terms of the contract are then checked (step 1306).

Then, a determination is made as to whether the items have not yet been returned (step 1308). If the unique digital items have been returned, a determination is made as to whether lease expiration criterion has been met (step 1310). If the criterion has been met, a determination is made as to whether the requested compensation is allowed by the contract (step 1312). If the requested compensation is allowed, then the compensation portion of the listing for the deposit is transferred to the party's trusted third party account (step 1314).

Then, a determination is made as to whether the contract is complete (step 1316). If the contract is complete, the contract is destroyed (step 1318). Then a determination is made as to whether the party elects to receive the compensation (step 1320). If the party elects to receive the compensation, a redemption request is processed for the compensation in which the redemption request includes an indication of the party's recipient storage server account (step 1322) with the process terminating thereafter.

With reference again to step 1320, if the party does not elect to receive the compensation, the process terminates. Turning back to step 1316, if the contract is not complete, the process also terminates. With reference back to step 1312, the process terminates if the requested compensation is not allowed by contract. Turning back to step 1310, the process terminates if the lease expiration criterion has not been met. The process also terminates if the items have not been returned in step 1308.

With reference again to step 1304, if the unique digital item has not been returned, the process then terminates without returning the deposit. The process also terminates in step 1302 if the lease is not complete.

Figure 14:
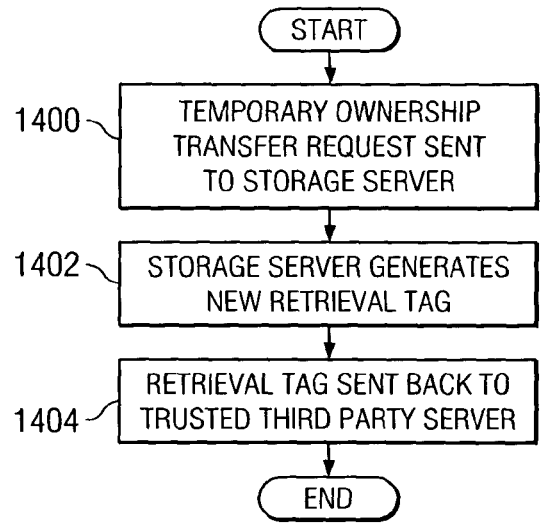
FIG. 14 is a flowchart of a process for conducting a temporary ownership transfer in accordance with a preferred embodiment of the present invention.

Turning next to FIG. 14, a flowchart of a process for conducting a temporary ownership transfer is depicted in accordance with a preferred embodiment of the present invention. The process illustrated in FIG. 14, may be implemented in a server process 402 in Web server 400 in FIG. 4. This process may be initiated to automatically return a unique digital item at the end of a lease.

The process begins by receiving a temporary ownership transfer request at the storage server (step 1400). The storage server generates a new retrieval tag in response to receiving the response (step 1402). This retrieval tag is then sent back to the trusted third party server (step 1404), with the process terminating thereafter.

In the depicted examples, the items are unique items that may be transferred between different realms. Items may be made unique in many different ways. For example, a unique digital item may be identified as unique based on a unique identifier associated with the item. The unique digital item may also have a unique digital signature.

Thus, the present invention provides a method, apparatus, and computer instructions for transferring digital property, such as unique digital items. These unique digital items may take various forms such as armors, rings, characters, and houses that exist on a server for a game or other application. The mechanism of the present invention provides an ability to transfer an item between parties or trade items between parties in a fashion that reduces the chance that a fraudulent transaction occurs. The mechanism allows for the placing of the unique item into a storage in which the unique item is held until conditions for releasing the item are met. The mechanism of the present invention employs the use of a tag, such as a retrieval tag or a lease tag, to facilitate the storing, locating, and transferring of the unique digital item. Additionally, the mechanism of the present invention may apply to exchanges or temporary ownership contracts involving more than two parties. Further, the number of items handled by the mechanism of the present invention may vary depending on the particular exchange.

Also, the items may be located on different servers from each other. For example, if two unique digital items are being exchanged, these two items may be located on separate Web servers. The exchange in this situation causes the two items to be moved to different servers. In a situation in which a unique digital item is moved from one server to another server, the unique digital item may be moved in a number of different ways. For example, a new instance of the unique digital item may be created on the target server to which the item is to be moved, with the original digital item being destroyed on the source server on which the unique digital item originated.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a network data processing system for temporarily transferring a unique digital item, the method comprising:

receiving a request for a temporary transfer of a unique digital item in an account of a first party;

responsive to receiving the request, transferring the unique digital item to a storage in association with a retrieval tag;

receiving a deposit from a second party;

transferring the unique digital item from the storage to an account of the second party after the deposit has been received from the second party;

responsive to receiving the retrieval tag from a trusted third-party server after transferring the unique digital item to the second party, performing an authentication process on the retrieval tag;

responsive to authenticating the retrieval tag, determining whether the unique digital item has been returned to an account of the first party; and returning the deposit to the second party if the unique digital item has been returned to the first party.

2. The method of claim 1 further comprising:

responsive to receiving the retrieval tag from the first party after transferring the unique digital item, determining whether a lease period for the unique digital item has expired;

determining whether the unique digital item has been returned to the first party if the lease period has expired;

transferring the deposit to the first party if the unique digital item has not be returned to the first party and the lease period has expired.

3. The method of claim 1, wherein the storage is located in a server on which the unique digital item is used.

4. The method of claim 1, wherein the unique digital item is a character in an online game.

5. The method of claim 1, wherein the unique digital item is a castle in an online game.

6. The method of claim 1, wherein the storage is located at an escrow service.

7. The method of claim 1, wherein the deposit is at least one of another unique digital item, currency, and a deed.

8. The method of claim 1 further comprising:

responsive to a lease period for the unique digital item expiring, marking the unique digital item as being untradeable.

9. A data processing system for temporarily transferring a unique digital item, the data processing system comprising:

first receiving means for receiving a request for a temporary transfer of a unique digital item in an account of a first party;

first transferring means, responsive to receiving the request, for transferring the unique digital item to a storage in association with a retrieval tag;

second receiving means for receiving a deposit from a second party;

second transferring means for transferring the unique digital item from the storage to an account of the second party after the deposit has been received from the second party;

performing means, responsive to receiving the retrieval tag from a trusted third-party server after transferring the unique digital item to the second party, for performing an authentication process on the retrieval tag;

determining means, responsive to authenticating the retrieval tag, for determining whether the unique digital item has been returned to an account of the first party; and returning means for returning the deposit to the second party if the unique digital item has been returned to the first party.

10. The data processing system of claim 9, wherein the determining means is a first determining means and further comprising:
  second determining means, responsive to receiving the retrieval tag from the first party after transferring the unique digital item, for determining whether a lease period for the unique digital item has expired;
  third determining means whether the unique digital item has been returned to the first party if the lease period has expired;
  third transferring means for transferring the deposit to the first party if the unique digital item has not be returned to the first party and the lease period has expired.

11. The data processing system of claim 9, wherein the storage is located in a server on which the unique digital item is used.

12. The data processing system of claim 9, wherein the unique digital item is a character in an online game.

13. The data processing system of claim 9, wherein the unique digital item is a castle in an online game.

14. The data processing system of claim 9, wherein the storage is located at an escrow service.

15. The data processing system of claim 9, wherein the deposit is at least one of another unique digital item, currency, and a deed.

16. The data processing system of claim 9 further comprising:
  marking means, responsive to a lease period for the unique digital item expiring, for marking the unique digital item as being untradeable.

17. A data processing system comprising:
  a bus system;
  a memory connected to the bus system, wherein the memory includes a set of instructions, that when executed by a processor causes the processor to perform the steps of:
  receiving by a processing unit a request for a temporary transfer of a unique digital item in an account of a first party;
  transferring by the processing unit the unique digital item to a storage in association with a retrieval tag in response to receiving the request;
  receiving by the processing unit a deposit from a second party;
  transferring by the processing unit the unique digital item from the storage to an account of the second party after the deposit has been received from the second party;
  performing an authentication process on the retrieval tag in response to receiving the retrieval tag from a trusted third-party server after transferring the unique digital item to the second party;
  determining by the processing unit whether the unique digital item has been returned to an account of the first party in response to authenticating the retrieval tag; and
  returning the deposit to the second party when it is determined by the processing unit that the unique digital item has been returned to the first party.

18. A computer readable storage medium storing executable instructions that when executed by a processor causes the processor to perform the steps of:
  receiving a request for a temporary transfer of a unique digital item in an account of a first party;
  responsive to receiving the request, for transferring the unique digital item to a storage in association with a retrieval tag;
  receiving a deposit from a second party;
  transferring the unique digital item from the storage to an account of the second party after the deposit has been received from the second party;
  responsive to receiving the retrieval tag from a trusted third-party server after transferring the unique digital item to the second party, performing an authentication process on the retrieval tag;
  responsive to authenticating the retrieval tag, determining whether the unique digital item has been returned to an account of the first party; and
  returning the deposit to the second party when it is determined that the unique digital item has been returned to the first party.

* * * * *